US011311808B2

(12) United States Patent
Schwartz et al.

(10) Patent No.: US 11,311,808 B2
(45) Date of Patent: Apr. 26, 2022

(54) SYSTEMS AND METHODS TO PREDICT A FUTURE OUTCOME AT A LIVE SPORT EVENT

(71) Applicant: Tempus Ex Machina, Inc., San Francisco, CA (US)

(72) Inventors: Erik Schwartz, Los Altos Hills, CA (US); Michael Naquin, Alamo, CA (US); Christopher Brown, Atlanta, GA (US); Steve Xing, San Francisco, CA (US); Pawel Czarnecki, San Francisco, CA (US); Charles D. Ebersol, Los Angeles, CA (US)

(73) Assignee: Tempus Ex Machina, Inc., San Francisco, CA (US)

( * ) Notice: Subject to any disclaimer, the term of this patent is extended or adjusted under 35 U.S.C. 154(b) by 222 days.

(21) Appl. No.: 16/747,434

(22) Filed: Jan. 20, 2020

(65) Prior Publication Data

US 2020/0230501 A1 Jul. 23, 2020

Related U.S. Application Data

(60) Provisional application No. 62/802,182, filed on Feb. 6, 2019, provisional application No. 62/794,980, filed on Jan. 21, 2019.

(51) Int. Cl.
*A63F 13/65* (2014.01)
*A63F 13/816* (2014.01)

(52) U.S. Cl.
CPC ............ *A63F 13/65* (2014.09); *A63F 13/816* (2014.09)

(58) Field of Classification Search
CPC ...... A63F 13/65; A63F 13/428; A63F 13/812; A63F 13/816; A63F 2300/1062;
(Continued)

(56) References Cited

U.S. PATENT DOCUMENTS

| | | | | |
|---|---|---|---|---|
| 6,236,900 | B1 * | 5/2001 | Geiger | G06Q 50/34<br>463/16 |
| 6,293,868 | B1 * | 9/2001 | Bernard | A63F 3/081<br>463/4 |

(Continued)

OTHER PUBLICATIONS

Le et al., Data-Driven Ghosting using Deep Imitation Learning, Mar. 3-4, 2017, Sports Analytics Conference. (Year: 2017).

(Continued)

*Primary Examiner* — Steven J Hylinski
(74) *Attorney, Agent, or Firm* — Van Pelt, Yi & James LLP

(57) ABSTRACT

In an embodiment, a process to predict an outcome of a competition includes receiving time-stamped position information of participant(s), the time-stamped position information captured by a telemetry tracking system during the competition. The process includes calculating while the competition is ongoing a covariate parameter for each of one or more participants at a point in time, where each respective covariate parameter is derived from the time-stamped position information of a corresponding participant at the point in time. The process includes predicting the outcome of the competition, as of the point in time, based at least in part on (i) a difference between a calculated competitor strength of the first competitor the second competitor based on historical data associated with the competitors, and (ii) the calculated first covariate parameter(s).

29 Claims, 10 Drawing Sheets

(58) Field of Classification Search

CPC ........ A63F 2300/5573; A63F 2300/558; A63F 2300/60; A63F 2300/6027; A63F 2300/61; A63F 2300/64; A63F 2300/65; A63F 2300/69; A63F 2300/8005; A63F 2300/8011; H04N 21/287; G07F 17/3288; G07F 17/3239; G07F 17/3279

See application file for complete search history.

(56) References Cited

U.S. PATENT DOCUMENTS 6,394,895 B1* 5/2002 Mino .................... A63F 13/005 463/3
9,033,781 B2* 5/2015 Steir .................... G07F 17/3288 463/1
9,870,674 B2* 1/2018 Hayon ................ G07F 17/3244
10,491,943 B1* 11/2019 Wahlquist-Ortiz ..... A63F 13/46
10,926,183 B2* 2/2021 Covington ............. G06N 7/005
2008/0103997 A1* 5/2008 Fein .................... G06F 16/2462 706/12
2008/0188353 A1* 8/2008 Vitolo .................. A61B 5/1128 482/8
2008/0312010 A1* 12/2008 Marty ................ A63B 24/0021 473/447
2009/0262137 A1* 10/2009 Walker ................... H04H 60/04 345/629
2010/0035672 A1* 2/2010 Root .................. G07F 17/3288 463/2
2010/0179930 A1* 7/2010 Teller ..................... G06N 20/00 706/12
2010/0298958 A1* 11/2010 Connelly ............... A63B 71/06 700/93
2011/0014974 A1* 1/2011 Tort .................... G07F 17/3227 463/25
2012/0202594 A1 8/2012 Bistis
2012/0214575 A1* 8/2012 Amaitis ................ G07F 17/323 463/25
2014/0018156 A1* 1/2014 Rizzotti ................ A63F 13/216 463/25
2014/0365194 A1 12/2014 O'Hagan
2015/0131845 A1* 5/2015 Forouhar ................ G06F 16/71 382/100
2015/0148129 A1* 5/2015 Austerlade .......... G07F 17/3234 463/31
2016/0260015 A1 9/2016 Lucey
2017/0064240 A1* 3/2017 Mangat ............... G06F 16/5866
2017/0165581 A1 6/2017 Mcauley
2018/0157974 A1 6/2018 Carr
2018/0190077 A1 7/2018 Hall

OTHER PUBLICATIONS

David et al., NFL Prediction Using Committees of Artificial Neural Networks, Journal of Quantitative Analysis in Sports, 2011, vol. 7, Issue 2.

Glickman et al., Estimating Team Strength in the NFL, Apr. 28, 2016.

Jim Warner, Predicting Margin of Victory in NFL Games: Machine Learning vs. The Las Vegas Line, Dec. 17, 2010.

Uzoma et al., A Hybrid Prediction System for American NFL Results, International Journal of Computer Applications Technology and Research, 2015, pp. 42-47, vol. 4, Issue 1.

* cited by examiner

At time 03:12

SYSTEMS AND METHODS TO PREDICT A FUTURE OUTCOME AT A LIVE SPORT EVENT

CROSS REFERENCE TO OTHER APPLICATIONS

This application claims priority to U.S. Provisional Patent Application No. 62/794,980 entitled SYSTEMS AND METHODS FOR PREDICTING A FUTURE OUTCOME AT A LIVE SPORT EVENT USING EXTENDED COVARIATES filed Jan. 21, 2019, which is incorporated herein by reference for all purposes. This application claims priority to U.S. Provisional Patent Application No. 62/802,182 entitled SYSTEMS AND METHODS FOR PREDICTING A FUTURE OUTCOME AT A LIVE SPORT EVENT USING EXTENDED COVARIATES filed Feb. 6, 2019, which is incorporated herein by reference for all purposes.

BACKGROUND OF THE INVENTION

Evaluation of team strengths and players' abilities, and predicting outcomes of sport events (e.g., football games) have an important role in the sport industry for increasing spectators' interest and engagement. The evaluation is fundamentally based on collection and analyses of play-by-play data. As an example, fantasy sports leagues and betting and/or gambling games are popular forms of applications using such historical play-by-play data in allowing spectators to get more involved with the sporting event. Conventional approaches for evaluating team strengths, players, and thereby predicting outcomes of sport events are based on historical play-by-play data, such as data collected and published by the National Football League (NFL) at NFL.com. However, the play-by-data provided by the NFL is limited to only certain players of the teams. Also, such data is made available only after sport events are finished.

BRIEF SUMMARY

Techniques (including a system, a processor, and a computer program product) for predicting an outcome of a live sport event are disclosed. In various embodiments, a process to predict an outcome of a competition includes receiving time-stamped position information of participant(s), the time-stamped position information captured by a telemetry tracking system during the competition. The process includes calculating while the competition is ongoing a covariate parameter for each of one or more participants at a point in time, where each respective covariate parameter is derived from the time-stamped position information of a corresponding participant at the point in time. The process includes predicting the outcome of the competition, as of the point in time, based at least in part on (i) a difference between a calculated competitor strength of the first competitor the second competitor based on historical data associated with the competitors, and (ii) the calculated first covariate parameter(s).

Examples of an outcome of a live sport event include, without limitation, an outcome of a play, an outcome of a session (quarter, half for example) in a game, or an outcome of an entire live sport event (game), etc. Accurately and efficiently predicting the outcome while an event is ongoing (live) is particularly challenging because conventional techniques are slow and typically unable to predict an outcome of a play or portion of the event prior to conclusion of the event. Other conventional techniques output a prediction quickly, but the prediction is inaccurate sometimes because such predictions rely solely on historical data and do not account for the makeup (players) of a team.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In various embodiments, the outcome of a live sport event is predicted using extended covariates describing team strengths and players' abilities among other things. As further described below, the extended covariates are derived from telemetric data collected by a player tracking system. The examples below chiefly use the example of gridiron (American) football, but this is not intended to be limited and the techniques may be applied to other types of competitions such as live sport events. As further described below, historical data including tracking data may be collected during a competition and the information applied to a later competition to predict an outcome of the later competition.

Figure 1:
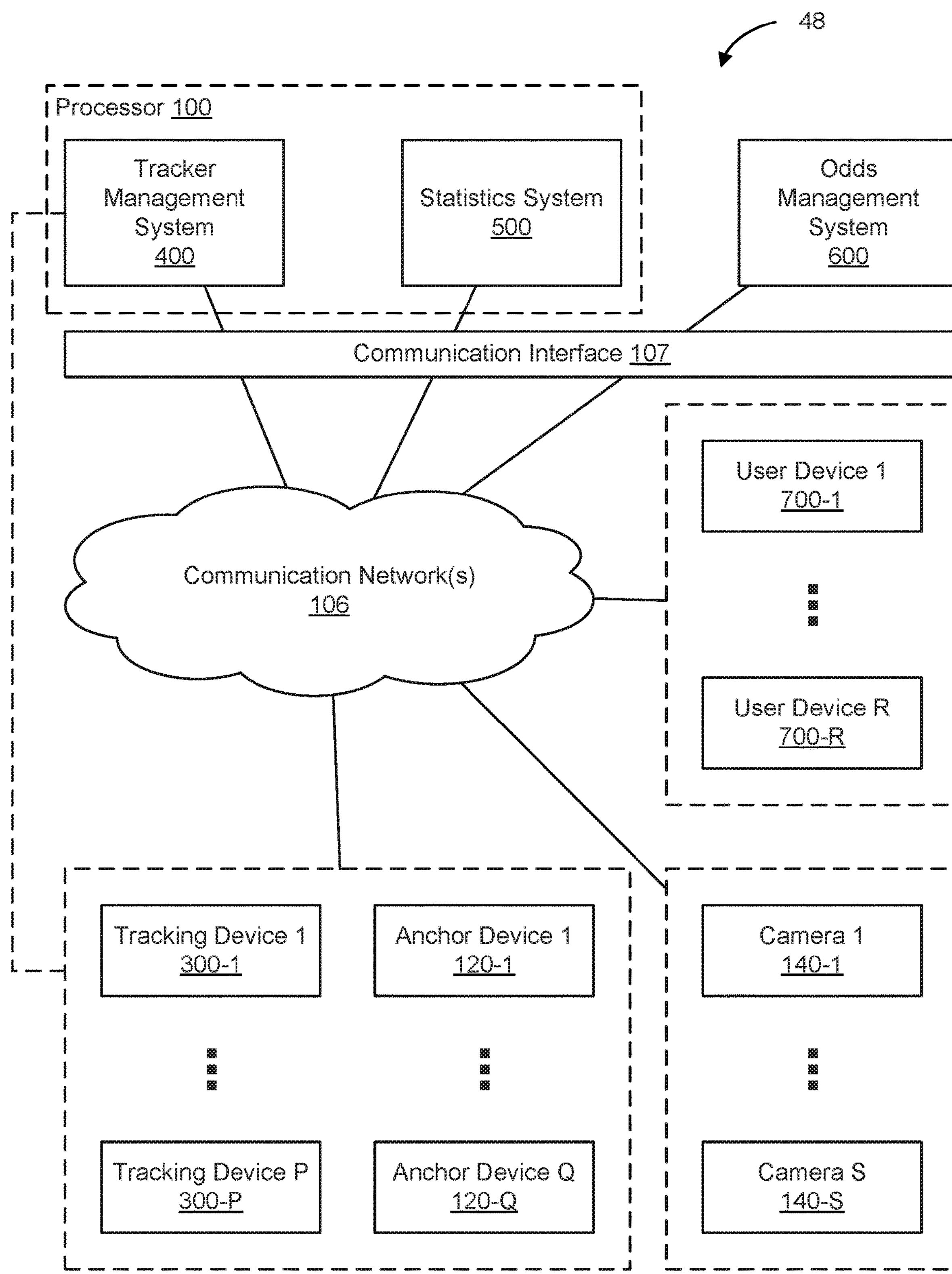
FIG. 1 is a block diagram illustrating an embodiment of a system for predicting a future outcome at a live sport event using extended covariates.

FIG. 1 is a block diagram illustrating an embodiment of a system for predicting a future outcome at a live sport event using extended covariates. This exemplary system 48 predicts an outcome of a competition between a first competitor and a second competitor. The first competitor includes a first set of one or more participants and a second competitor includes a second set of one or more participants. System 48 includes communication interface 107 and processor 100. Communication interface 107 is configured to receive time-stamped position information of one or more participants of one or both of the first set of participant(s) and the second set of participant(s) in the competition. In various embodiments, the time-stamped position information is captured by a telemetry tracking system during the competition. In this example, the telemetry tracking system is made up of tracking device(s) 300-1 to 300-P, anchor device(s) 120-1 to 120-Q, and optionally camera(s) 140-1 to 140-S, which are managed by tracker management system 400 as further described below.

Processor 100 is coupled to communication interface 107 and configured to calculate, e.g., while the present competition is ongoing, a first covariate parameter for each of one or more participants in one or both of the first set of participants and the second set of participants at and/or as of a point in time. Each respective first covariate parameter is derived from the time-stamped position information of a corresponding participant of the first or second set of one or more participants in the present competition at the point in time. Some examples of covariate parameters are further discussed with respect to Tables 1 and 2 below.

Processor 100 is further configured to predict the outcome of the present competition, as of the point in time, based at least in part on (i) a difference between a calculated competitor strength of the first competitor and a calculated competitor strength of the second competitor based at least in part on historical data associated with the first and second competitors, respectively, and (ii) the calculated first covariate parameter(s).

In various embodiments, processor 100 includes tracking management system 400 for tracking a plurality of subjects and statistics system 500 for managing various statistics. Tracking device management system 400 facilitates managing of one or more tracking devices 300 and one or more anchor devices 120 of the system. Statistics system 500 stores and/or generates various statistics for use in predicting an outcome at a competition such as a live sports event, providing odds for wagering on various circumstances or outcomes in the sports event, and other similar activities. In various embodiments, tracking management system 400 and statistics system 500 comprise software engines or modules running on processor 100 and/or separate or potentially separate systems, each comprising and/or running on one or more processors comprising processor 100.

In various embodiments, system 48 includes odds management system 600 for managing odds and a plurality of user devices 700-1 to 700-R. Although odds management system 600 is shown external to processor 100, in some embodiments the odds management system is included in the processor. Odds management system 600 facilitates determining odds for outcomes in a sports event and managing various models related to predicting outcomes at the live event.

In some embodiments, the system includes one or more user devices 700 that facilitate end user interaction with various systems of the present disclosure, such as odds management system 600. Moreover, in some embodiments, system 48 includes one or more cameras 140 that capture live images and/or video of a live event that is then utilized by the systems of the present disclosure. In some embodiments, the cameras 140 include one or more high resolution cameras. By way of non-limiting example, the one or more high resolution cameras includes a camera with a 1080p resolution, 1440p resolution, 2K resolution, 4K resolution, or 8K resolution. Utilizing a camera 140 with a high resolution allows for a video feed captured by the camera to be partitioned at a higher resolution, while also allowing for more partitions to be created without a noticeable decline in image quality.

The above-identified components are interconnected, optionally through a communications network. Elements in dashed boxes are optional combined as a single system or device. Of course, other topologies of the computer system 48 are possible. For instance, in some implementations, any of the illustrated devices and systems can in fact constitute several computer systems that are linked together in a network, or be a virtual machine or a container in a cloud computing environment. Moreover, in some embodiments rather than relying on a physical communications network 106, the illustrated devices and systems wirelessly transmit information between each other. As such, the exemplary topology shown in FIG. 1 merely serves to describe the features of an embodiment of the present disclosure in a manner that will be readily understood to one of skill in the art.

In some implementations, the communication network 106 interconnects tracking device management system 400 that manages one or more tracking devices 300 and one or more anchors 120, statistics system 500, odds management system 600, one or more user devices 700, and one or more cameras 140 with each other, as well as optional external systems and devices. In some implementations, the communication network 106 optionally includes the Internet, one or more local area networks (LANs), one or more wide area networks (WANs), other types of networks, or a combination of such networks.

Examples of networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In various embodiments, processor 100 includes a machine learning engine 210 (not shown in FIG. 1) that facilitates the prediction of the outcome of a competitions. The next figure describes an example of processor 100 that includes a machine learning engine in greater detail.

Figure 2A:
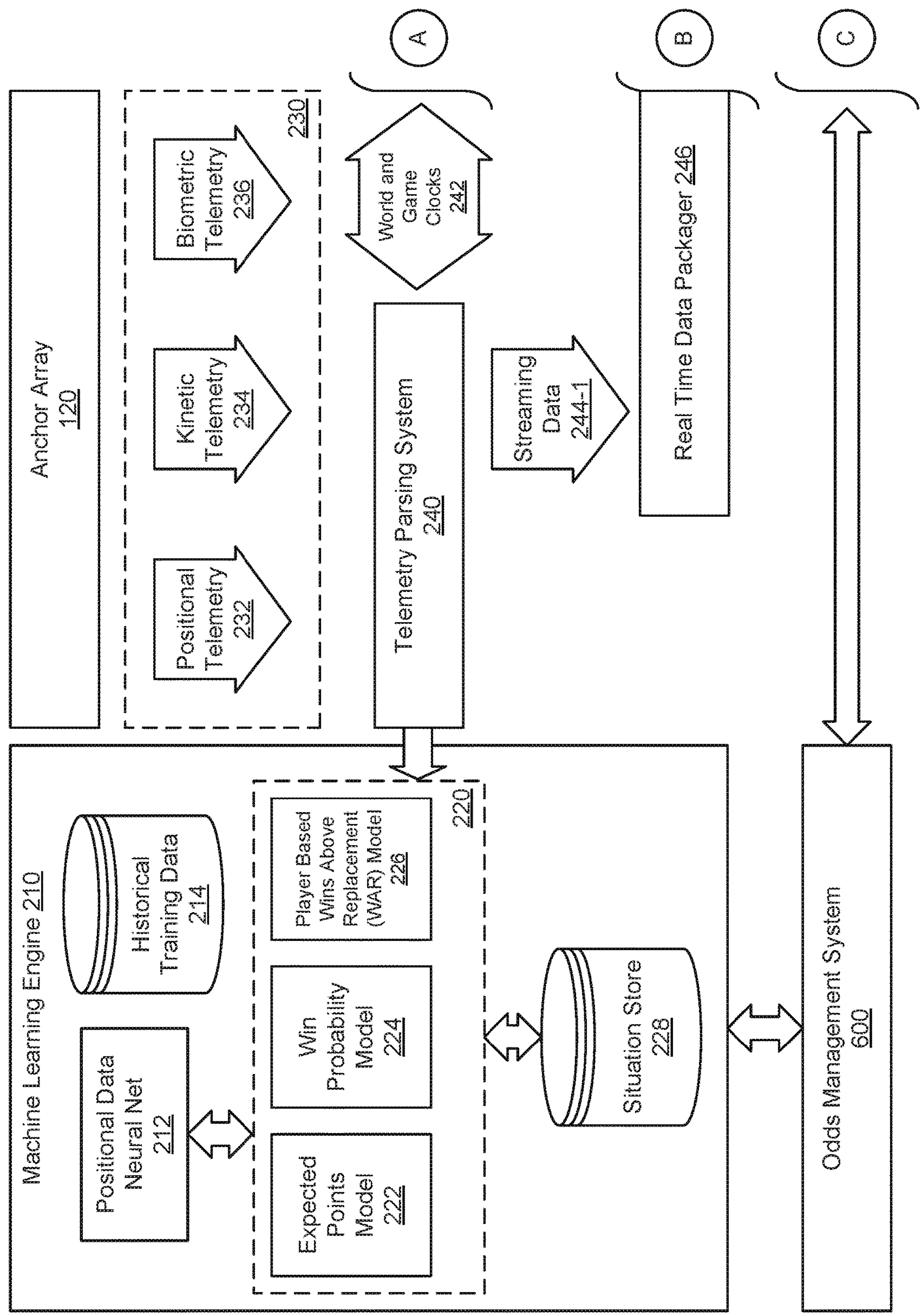
FIG. 2A shows a block diagram illustrating an embodiment of a system for predicting a future outcome at a live sport event using extended covariates.
Figure 2B:
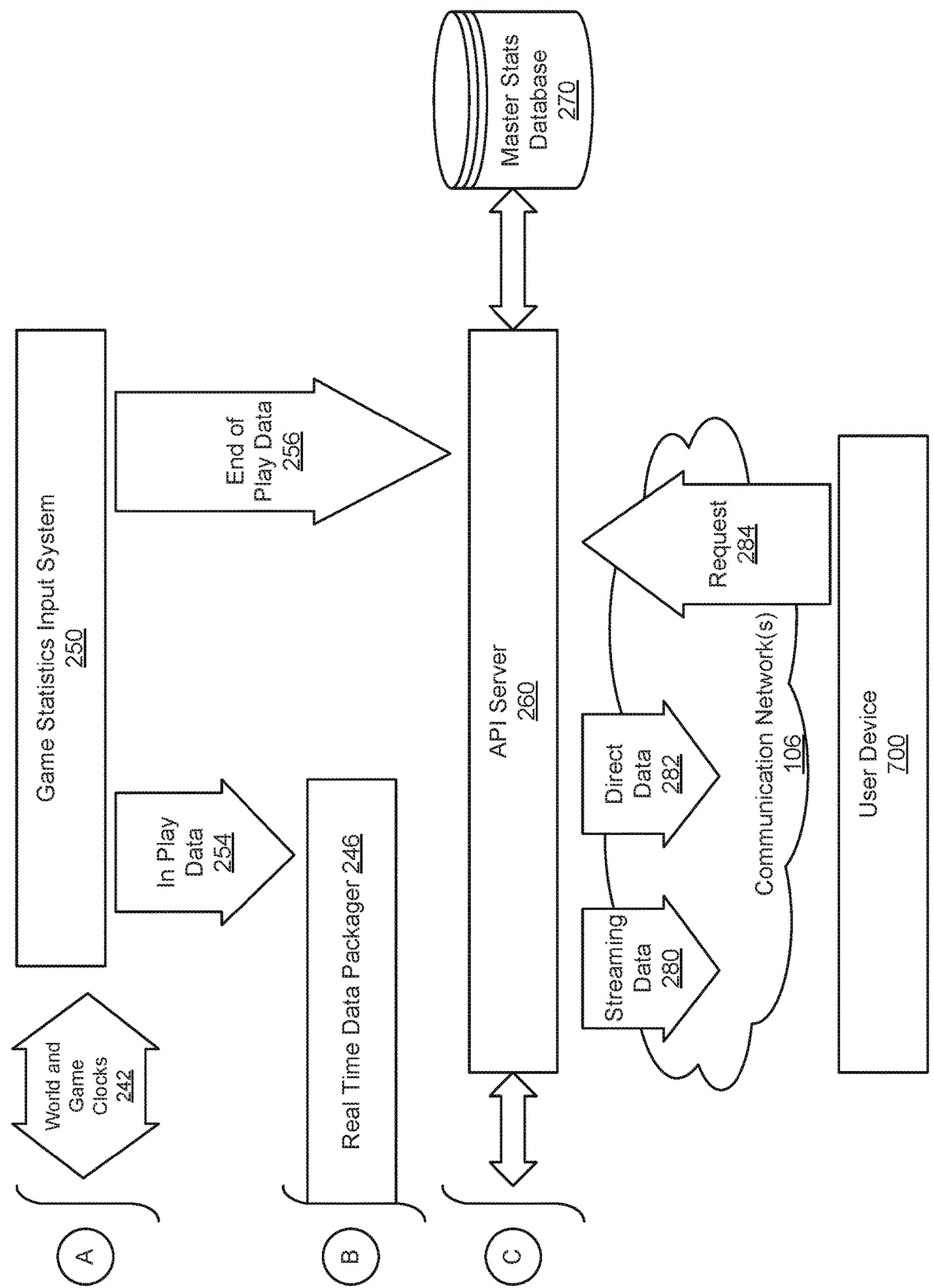
FIG. 2B shows a block diagram illustrating an embodiment of a system for predicting a future outcome at a live sport event using extended covariates.

FIGS. 2A and 2B show a block diagram illustrating an embodiment of a system for predicting a future outcome at a live sport event using extended covariates. As depicted in FIG. 2A, an array of anchor devices 120 receives telemetry data 230 from one or more tracking devices 300. In order to minimize error in receiving the telemetry from the one or more tracking devices 300, the array of anchor devices 120 preferably includes at least three anchor devices. Inclusion of at least three anchor devices 120 within the array of anchor devices allow for each ping (e.g., telemetry data 230) received from a respective tracking device 300 to be triangulated using the combined data from the at least three anchor that receive the respective ping. Additional details and information regarding systems and methods for receiving pings from tracking devices and the optimization thereof will be described in more detail infra, with particular reference to at least FIGS. 3 and 4.

In the example shown, the telemetry data 230 that is received by the array of anchors 120 from the one or more tracking devices 300 includes positional telemetry data 232. The positional telemetry data 232 provides location data for a respective tracking device 300, which describes a location of the tracking device within a spatial region. In some embodiments, this positional telemetry data 232 is provided as one or more Cartesian coordinates (e.g., an X coordinate, a Y coordinate, and/or Z a coordinate) that describe the position of each respective tracking device 300, although any coordinate system (e.g., polar coordinates, etc.) that describes the position of each respective tracking device 300 is used in alternative embodiments.

The telemetry data 230 that is received by the array of anchors 120 from the one or more tracking devices 300 includes kinetic telemetry data 234. The kinetic telemetry data 234 provides data related to various kinematics of the respective tracking device. In some embodiments, this kinetic telemetry data 234 is provided as a velocity of the respective tracking device 300, an acceleration of the respective tracking device, and/or a jerk of the respective tracking device. Further, in some embodiments one or more of the above values is determined from an accelerometer (e.g., accelerometer 317 of FIG. 3) of the respective tracking device 300 and/or derived from the positional telemetry data 232 of the respective tracking device. Further, in some embodiments the telemetry data 230 that is received by the array of anchors 120 from the one or more tracking devices 300 includes biometric telemetry data 236. The biometric telemetry data 236 provides biometric information related to each subject associated with the respective tracking device 300. In some embodiments, this biometric information includes a heart rate of the subject, temperature (e.g., a skin temperature, a temporal temperature, etc.), and the like.

In some embodiments, the array of anchors 120 communicates the above described telemetry data (e.g., positional telemetry 232, kinetic telemetry 234, biometric telemetry 236) to a telemetry parsing system 240. Accordingly, in some embodiments the telemetry parsing system 240 communicates the telemetry data (e.g., stream of data 244) to a machine learning engine 210 and/or a real time data packager 246 for further processing and analysis.

In some embodiments, the real time data packager 246 synchronizes one or more data sources (e.g., streaming data 244 from telemetry parsing system 240, game statistics input system 250, machine learning engine 210, etc.) by using one or more timestamps associated with the respective data. For instance, in some embodiments the data sources provide data that is associated with a real world clock timestamp (e.g., an event occurred at and is associated with a real world time of 1:17 P.M.). In some embodiments, the data sources provide data that is associated with a game clock timestamp related to a live sports event (e.g., an event occurred with 2 minutes and 15 seconds remaining in the second quarter). Moreover, in some embodiments the data sources provide data that is associated with both the real world clock timestamp and the game clock timestamp. Synchronization of the data sources via timestamps allows for a designer of the present disclosure to provide services with an additional layer of accuracy, particularly with betting and wagering on outcomes at a live event. For instance, in some embodiments data provided to a user device 700 (e.g., streaming data 280 and/or direct data 282 of FIG. 2B) describes the wagering (e.g., odds) on a next play in a football game. In order to determine if an end user of the user device 700 places a wager within a predetermined window of time (e.g., before the snap of the ball of the next play), the game clock and real world time data received from the user device and/or communicated to the user device are analyzed and the wager is either validated, rejected, or held for further consideration.

In some embodiments, machine learning engine 210 receives data from various sources of the present disclosure in order to predict a future outcome at a live sporting event and generate statistics for analysis and use. For instance, in some embodiments the data sources of the machine learning engine 210 includes a positional data formation classifier 212, hereinafter "neural net," that provides information related to various configurations and formations of players at any given point of time in game. For instance, in some embodiments the formation classifier 212 parses the telemetry data 230 to analyze pre-snap formations of players. The analyses of the pre-snap telemetry data 230 allows for the formation classifier 212 to determine various states and conditions of the game, such as a down of a game, a positional rule violation within a game (e.g., off-sides, illegal motion, etc.), and the like. Moreover, in some embodiments the formation classifier 212 analyzes telemetry data 230 that is received subsequent the start of the play in order to further generate data and information related to how each formation evolves (e.g., an expected running route versus an actual running route, an expected blocking assignment versus an action blocking assignment, a speed of a player throughout a play, a distance between two players throughout a play, etc.).

In some embodiments, machine learning engine 210 includes a historical training data store 214. Historical data store 214 provides historical data and information related to each particular sport (e.g., sports historical data 508 of FIG. 5), each particular team associated with the particular sport (e.g., team historical data 510 of FIG. 5), and/or each particular player associated with the particular sport and/or team (e.g., player historical data 514 of FIG. 5). In some embodiments, this data is initially used as a training data set for the machine learning engine 210. However, the present disclosure is not limited thereto as this data may also be used to further augment the features and services provided by the machine learning engine 210 and other systems of the present disclosure.

Further, in some embodiments the machine learning engine 210 includes a variety of models 220 that are utilized to predict a future outcome of a sporting event and provide analysis of the sporting event. In some embodiments, the models 220 of the machine learning engine 210 include an expected points model 222. The expected points model 222 provides a likelihood of receiving points for a particular play at the event via a numerical value. In some embodiments, the models 220 of the machine learning engine 210 include a win probability model 224 that provides either a likelihood of each participating team of the event to win or a likelihood of any given point spread between the winning and losing teams at the event. Furthermore, in some embodiments the models 220 of the machine learning engine 210 include a player based wins above replacement (WAR) model 226. The WAR model 226 provides a contribution value a respective player adds to their corresponding team (e.g., player 1 provides a value of 1 to a respective team and player two provides a value of 2 to the respective team, therefore player two is worth more to the respective team).

In some embodiments, machine learning engine 210 include a situation store 228. The situation store 228 is a cache of various situational details and/or statistics that is accessed rapidly during a real game scenario. Rapid access to the situation store 228 prevents lag that would otherwise be induced from querying different databases and systems (e.g., positional data formation classifier 212, historical training data 214, etc.) in order to obtain the same information. Additional details and information regarding the machine learning engine and the components therein, including the various above described data stores and models, will be described in more detail infra, with particular reference to at least FIGS. 5 and 6.

Machine learning engine 210 communicates various odds and outputs of the various databases and models therein to an odds management system 600. In communicating with the machine learning engine 210, the odds management system 600 provides various wagers and predictive odds for future events at a sporting event to the user devices 700, while also updating these odds in real time to reflect current situations and statistics of a game.

As depicted in FIG. 2B, in some embodiments system 48 includes a game statistics input system 250. The game statistics input system 250 is configured for providing at least in play data 254, which, in example case of football, describes a state of the game during a given play (e.g., a weak side receiver ran a post route), as well as end of play data 256, which describes a state of the game after a given play (e.g., a play resulted in a first down at the opponents 42-yard line). In some embodiments, the data of the statistics input system 250 is associated with the world and game clock 242, and accordingly is communicated to the telemetry parsing system 240 and/or the machine learning engine 210. In some embodiments the game statistics input system 250 is subsumed by the formation classifier 212.

In some embodiments, various data is communicated to an application programming interface (API) server 260. This data may include streaming data 244, end of play data 256, data from the odds management system 600, or a combination thereof. Accordingly, the API server 260 facilitates communication between various components of the system 48, one or more user devices 700, and a master statistics database 270 in order to provide various features and services of the present disclosure (e.g., a stream of the game, a request for statistics, placing a wager on a play, etc.). Communication between the API server 260 and the one or more user devices 700 includes providing streaming data 280 and/or direct data 282 to each respective user device 700 through the communications network 106, as well as receiving various requests 284 from each respective user device. By way of non-limiting example, streaming data 280 includes tracking "telemetry" data including xyz coordinates of players or accelerometer data of players, direct data 282 includes clock, score, or remaining timeouts.

In some embodiments, the master statistics database 270 includes some or all of the statistics known to the machine learning engine 210 that are obtainable to a user. The master statistics database is updated regularly such as at the end of every play or every few plays. For instance, in some embodiments only a portion of the statistics known to the machine learning engine 210 is desired to be obtainable by a user, and thus is stored in the master statistics database 270. However, the present disclosure is not limited thereto. For instance, in some embodiments the master statistics database 270 is subsumed by the machine learning engine 270. Elements in dashed boxes are optional combined as a single system or device.

Now that an infrastructure of the system 48 has been generally described, an exemplary tracking device 300 will be described with reference to FIG. 3.

Figure 3:
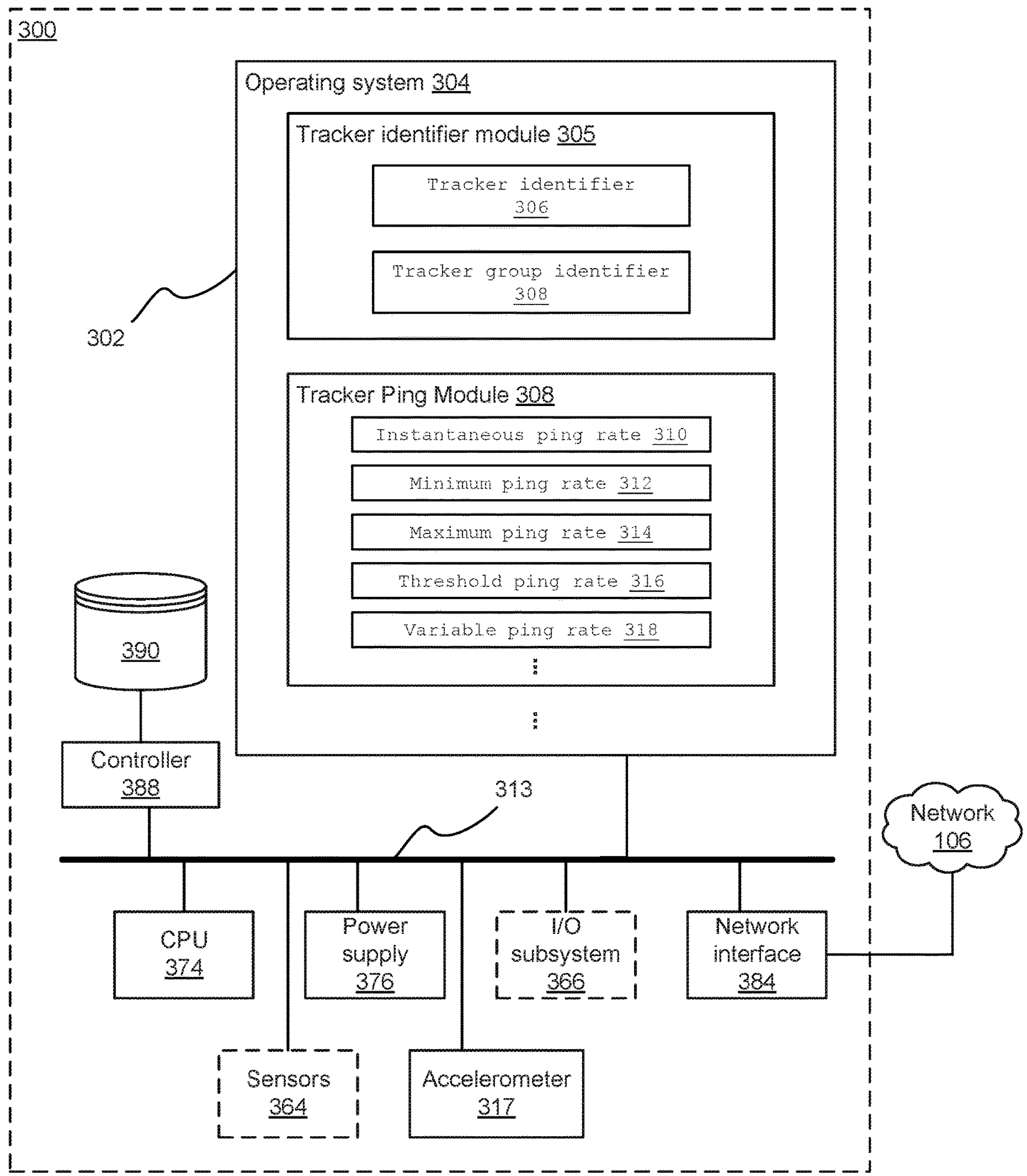
FIG. 3 is a block diagram illustrating an embodiment of a tracking device.

FIG. 3 is a block diagram illustrating an embodiment of a tracking device. In various implementations, the tracking device, hereinafter also a "tracker," includes one or more processing units (CPUs) 374, a memory 302 (e.g., a random access memory), one or more magnetic disk storage and/or persistent device 390 optionally accessed by one or more controllers 388, a network or other communications interface (which may include RF circuitry) 384, an accelerometer 317, one or more optional intensity sensors 364, an optional input/output (I/O) subsystem 366, one or more communication busses 313 for interconnecting the aforementioned components, and a power supply 376 for powering the aforementioned components. In some implementations, data in memory 302 is seamlessly shared with non-volatile memory 390 using known computing techniques such as caching. In some implementations, memory 302 and/or memory 390 may in fact be hosted on computers that are external to the tracking device 300 but that can be electronically accessed by the tracking device 300 over an Internet, intranet, or other form of network or electronic cable (illustrated as element 106 in FIG. 1) using network interface 384.

In various embodiments, the tracking device 300 illustrated in FIG. 3 includes, in addition to accelerometer(s) 317, a magnetometer and/or a GPS (or GLONASS or other global navigation system) receiver for obtaining information concerning a location and/or an orientation (e.g., portrait or landscape) of the tracking device 300.

It should be appreciated that the tracking device 300 illustrated in FIG. 3 is only one example of a device that may be used for obtaining telemetry data (e.g., positional telemetry 232, kinetic telemetry 234, and biometric telemetry 236) of a corresponding subject, and that the tracking device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 302 of the tracking device 300 illustrated in FIG. 3 optionally includes high-speed random access memory and optionally also includes non-volatile memory, such as one or more magnetic disk storage devices, flash memory devices, or other non-volatile solid-state memory devices. Access to memory 302 by other components of the tracking device 300, such as CPU(s) 374 is, optionally, controlled by the memory controller 388.

In some embodiments, the CPU(s) 374 and memory controller 388 are, optionally, implemented on a single chip. In some other embodiments, the CPU(s) 374 and memory controller 388 are implemented on separate chips.

Radio frequency (RF) circuitry of network interface 384 receives and sends RF signals, also called electromagnetic signals. In some embodiments, the RF circuitry 384 converts electrical signals to from electromagnetic signals and communicates with communication networks and other communications devices, such as the one or more anchor devices 120 and/or the tracking device management system 400, via the electromagnetic signals. The RF circuitry 384 optionally includes well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. On some embodiments, the RF circuitry 384 optionally communicates with the communication network 106.

In some embodiments, the network interface (including RF circuitry) 384 operates via ultra-wide band (UWB) technology, which allows for the tracking device 300 to communicate with an array of anchor devices 120 in a crowded spatial region, such as a live sporting event. In some embodiments, the tracking device 300 transmits a low power (e.g., approximately 1 milliwatt (mW)) signal at a predetermined center frequency (e.g., 6.55 GHz 200 mHz, yielding a total frequency range of transmission of approximately about 6.35 GHz to about 6.75 GHz). As used herein, these communications and transmissions are hereinafter referred to as a "ping." For a discussion of UWB, see Jiang et al, 2000, "Ultra-Wide Band technology applications in construction: a review," Organization, Technology and Management in Construction 2(2), 207-213.

In some embodiments, the power supply 358 optionally includes a power management system, one or more power sources (e.g., a battery, a recharging system, a power failure detection circuit, a power converter or inverter, a power status indicator (e.g., a light-emitting diode (LED)) and any other components associated with the generation, management and distribution of power in such tracking devices 300. In some embodiments, the telemetry data 230 includes information related to the power supply 358 of the respective tracking device 300, such as a battery consumption or an expected period of time until the tracking device requires more power.

In some implementations, the memory 302 of the tracking device 300 for tracking a respective subject stores:

- an operating system 304 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- a tracking device identifier module 305 that stores data used to identify the respective tracking device 300 including a tracking device identifier 306 and an optional tracking device group identifier 307; and
- a tracking device ping module 308 that stores data and information related to a ping rate of the respective tracking device, the tracking device ping module 308 including:
  - an instantaneous ping rate 310 that describes a current ping rate a respective tracking device 300 is currently operating at,
  - a minimum ping rate 312 that describes a minimum ping rate a respective tracking device 300 may operate at,
  - a maximum ping rate 314 that describes a maximum ping rate a respective tracking device 300 may operate at,
  - a threshold ping rate 316 that describes a minimum ping rate a respective tracking device 300 may operate at, and
  - a variable ping rate flag 318.

The tracking device identifier module 305 stores information that relates to identifying the respective tracking device 300 from a plurality of tracking devices (e.g., tracking device 1 300-1, tracking device 2 300-3, . . . , tracking device P 300-P). In some embodiments, the information stored by the tracking device identifier module 305 includes a tracking device identifier (ID) 306 that includes a unique ID (e.g., a serial number or a code) representing the respective tracking device 300. In some embodiments, the tracking device ID module 305 includes a tracking device group ID 307 that designates the respective tracking device 300 to one or more groups of tracking devices (e.g., tracking device group 418-2 of FIG. 4). Further, in some embodiments pings communicated by the respective tracking device 300 includes data of the tracking device ID module 305, allowing for an array of anchor devices 120 to identify pings received from more than one tracking device. Additional details and information regarding the grouping of a tracking device 300 will be describe in more detail infra, with particular reference to at least FIG. 4.

The tracking device ping module 308 stores data and information related to various ping parameters and conditions of respective tracking device 300, as well as facilitating management of the ping. For instance, in some embodiments the tracking device ping module 308 manages an instantaneous ping rate 310 of the respective tracking device 300 (e.g., managing an instantaneous ping rate 310 to be 10 Hertz (HZ)). In some embodiments, the tracking device 300 is configured with one or more ping rate limits, including one or more both of a minimum ping rate 312 and a maximum ping rate 314, that define a maximum and a minimum ping rate that the tracking device 300 may transmit pings. For instance, in some embodiments the minimum ping rate 312 and/or the maximum ping rate 314 may be set by the tracking device management system 400 based upon one or more of bandwidth limitations, a number of active tracking devices 300, and a type of expected activity (e.g., a sport and/or event types, an expected subject activity, etc.). When configured with one or both ping rate limits, the tracking device ping module 308 operates to adjust the instantaneous ping rate 310 between the minimum ping rate 312 and the maximum ping rate 314. Thus, automatic optimization of tracking management system 400 may be used in combination with automatic ping rate adjustment of tracking device 300. In some embodiments, tracking device ping module 308 is configured to compare detected motion from accelerometer 317 to a predefined threshold 316. Accordingly, the ping module 308 increases the instantaneous ping rate 310 in accordance with a determination that the detected motion is greater than predefined threshold 316 (e.g., until the instantaneous ping rate 310 reaches the maximum ping rate 314). Likewise, the ping module 308 decreases the instantaneous ping rate 310 (e.g., until the instantaneous ping rate 310 reaches the minimum ping rate 312) in accordance with a determination that the detected motion is less than the threshold ping rate 316.

In some embodiments, the ping module 310 includes a variable ping rate flag 318, which is configured (e.g., set wirelessly) by the tracking device management system 400, that determines whether ping module 308 automatically, or not, changes the instantons ping rate 310 based upon determined activity. For example, the tracking device management system 400 may set variable ping rate flag 318 to "false" for one or more tracking devices 300 that is associated with a player not currently participating on the field of play, wherein instantaneous ping rate 310 remains at a low rate even if the player is actively warming up for example. Tracking device management system 400 sets variable ping rate flag 318 to "true" for one or more players that is actively participating on the field of play. Furthermore, in some embodiments each tracking device 300 is dynamically configured based upon a location of the respective tracking device. For instance, in accordance with a determination that a tracking device 300 is within a field of play (e.g., if a player is actively participating in a game) as opposed to a determination that the tracking device is off the field of play (e.g., if a player is not actively participating in a game).

Utilizing the tracking device ping model 308 and/or the sensor (e.g., accelerometer 317 and/or optional sensors 364) within tracking device 300 increases reliability of the system 48 (e.g., the array of anchors 120, the telemetry parsing system 240, the tracking device management system 400, etc.) to track subjects disposed with the tracking device.

As previously described, in some embodiments each tracking device 300 provides telemetry data 230 that is received and communicated by various anchors 120 that are proximate to the respective tracking device 300. This telemetry data includes positional telemetry data 232 (e.g., X, Y, and/or Z coordinates), kinetic telemetry data 234 (e.g., velocity, acceleration, and/or jerk), and/or biometric telemetry data 236 (e.g., heart rate, physical attributes of a player such as shoulder width, etc.).

In some embodiments, each subject in the game is equipped with more than one tracking device 300 in order to increase the accuracy of the data received from the tracking devices about the subject. For instance, in some embodiments the left shoulder and the right shoulder of a respective subject are both equipped with a tracking device 300, each such tracking device functioning normally and having line of site to at least a subset of the anchors 120. Accordingly, in some embodiments the data from the left and right tracking devices 300 have their telemetry data 230 combined to form a single time-stamped object. This single object combines positional data from both tracking devices 300 to create a center line representation of a position of the respective player. Moreover, this center line calculated position provides a more accurate representation of the center of a player's position on the playing field. Further, using the relative positional data from two tracking devices 300 positioned on the left and right shoulders of a player, prior to creating the single player object as described above, allows the system 48 to determine a direction (e.g., a rotation) that the player is facing. In various embodiments, including rotational data greatly eases the task of creating avatars from data created by recording telemetry data 230 during a game and/or establishing sophisticated covariates that can be used to better predict future events in the game or the final outcome of the game itself.

In some embodiments, the tracking device 300 has any or all of the circuitry, hardware components, and software components found in the device depicted in FIG. 3. In the interest of brevity and clarity, only a few of the possible components of the tracking device 300 are shown to better emphasize the additional software modules that are installed on the tracking device 300.

Figure 4:
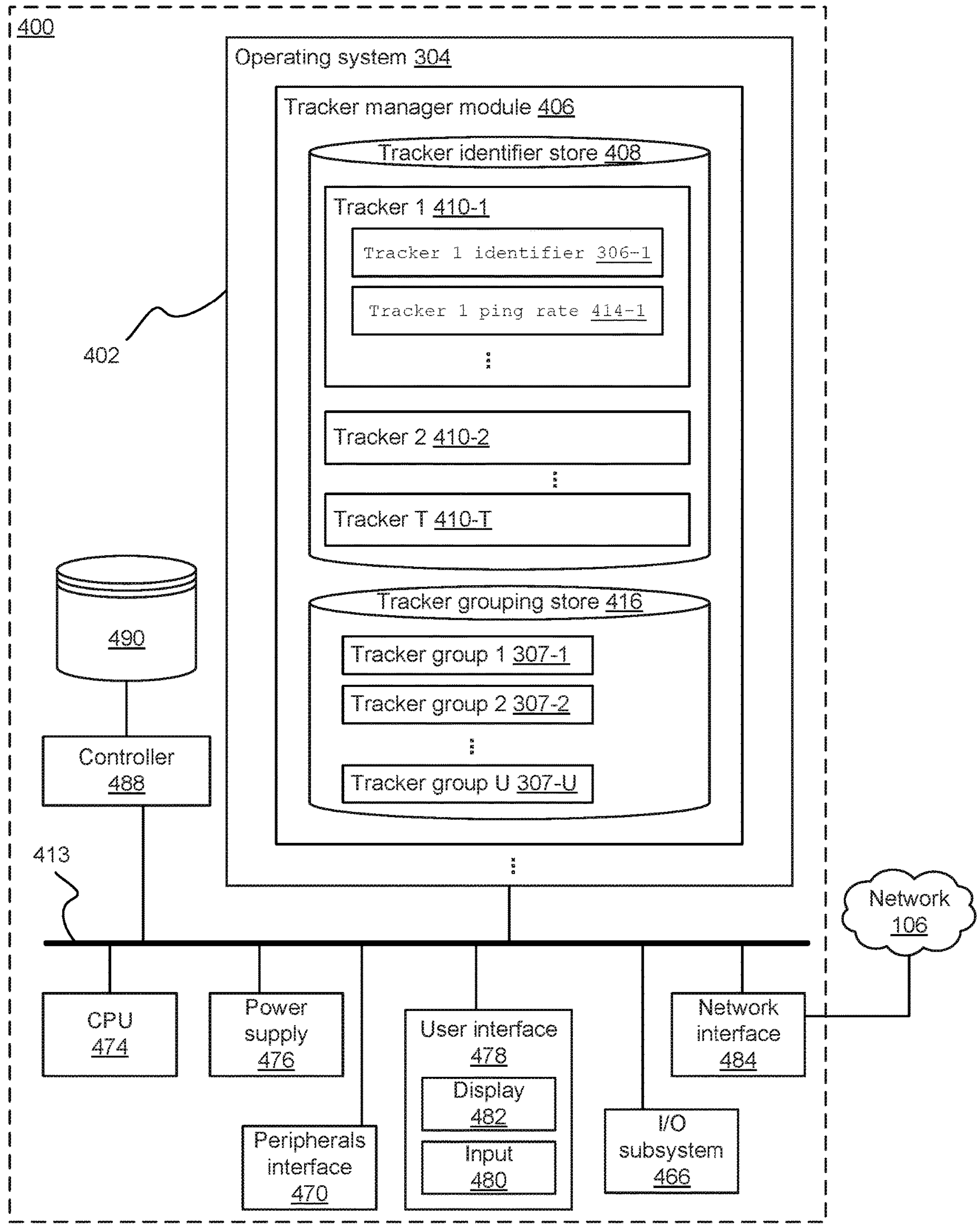
FIG. 4 is a block diagram illustrating an embodiment of a tracking device management system.

FIG. 4 is a block diagram illustrating an embodiment of a tracking device management system. Tracking device management system 400 is associated with one or more tracking devices 300 and anchors 120. The tracking device management system 400 includes one or more processing units (CPUs) 474, a peripherals interface 470, a memory controller 488, a network or other communications interface 484, a memory 402 (e.g., random access memory), a user interface 478, the user interface 478 including a display 482 and an input 480 (e.g., a keyboard, a keypad, a touch screen, etc.), an input/output (I/O) subsystem 466, one or more communication busses 413 for interconnecting the aforementioned components, and a power supply system 476 for powering the aforementioned components.

In some embodiments, the input 480 is a touch-sensitive display, such as a touch-sensitive surface. In some embodiments, the user interface 478 includes one or more soft keyboard embodiments. The soft keyboard embodiments may include standard (QWERTY) and/or non-standard configurations of symbols on the displayed icons.

It should be appreciated that tracking device management system 400 is only one example of a system that may be used in engaging with various tracking devices 300, and that tracking device management system 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more magnetic disk storage devices, flash memory devices, or other non-volatile solid-state memory devices. Access to memory 402 by other components of the management system 400, such as CPU(s) 474 is, optionally, controlled by memory controller 488.

Peripherals interface 470 can be used to couple input and output peripherals of the management system to CPU(s) 474 and memory 402. The one or more processors 474 run or execute various software programs and/or sets of instructions stored in memory 402 to perform various functions for the management system 400 and to process data.

In some embodiments, peripherals interface 470, CPU(s) 474, and memory controller 488 are, optionally, implemented on a single chip. In some other embodiments, they are, optionally, implemented on separate chips.

In some embodiments, power system 476 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 4, memory 402 of the tracking device management system preferably stores:

- an operating system 404 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components; and
- a tracking device manager module 406 for facilitating management of one or more tracking devices 300, the tracking device manager module including:
  - a tracking device identifier store 408 for storing pertinent information related to each respective tracking device 410-1 including a tracking device identifier 306 and a tracking device ping rate 414, and
  - a tracking device grouping store 416 for facilitating management of or more tracking device groups 307.

The tracking device identifier store 408 includes information related to each respective tracking device 410-1, including the tracking device identifier (ID) 306 for each respective tracking device 300 as well as a tracking device group 307 to which the respective tracking device is associated. For instance, in some embodiments a first tracking device group 307-1 is associated with the left shoulder of each respective subject and a second tracking device group 307-2 is associated with a right shoulder of each respective subject. Moreover, in some embodiments a third tracking device group 307-3 is associated with a first position (e.g., receiver, defensive end, safety, etc.) of each respective subject and a fourth tracking device group 307-4 is associated with a second position. Grouping 307 of the tracking devices 300 allows for a particular group to be designated with a particular ping rate (e.g., a faster ping rate for running backs). Grouping 307 of the tracking devices 300 also allows for a particular group to be isolated from other tracking devices that are not associated with the respective group, which is useful in viewing representations of the telemetry data 230 provided by the tracking devices of the group. Additional information related to tracking devices and tracking device management systems is found in U.S. Pat. No. 9,950,238, entitled "Object Tracking System Optimization and Tools."

Figure 5:
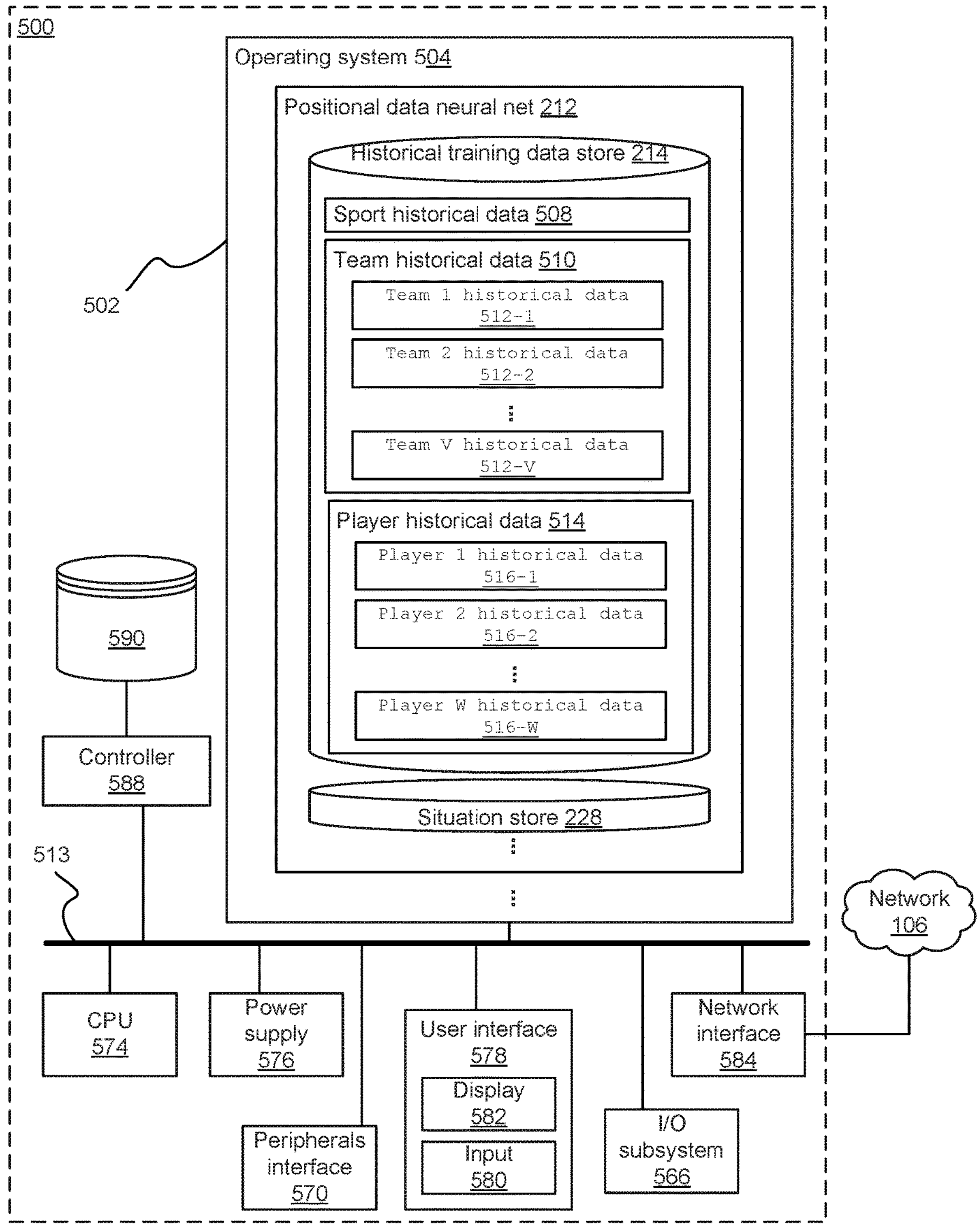
FIG. 5 is a block diagram illustrating an embodiment of a statistics system.

FIG. 5 is a block diagram illustrating an embodiment of a statistics system. Statistics system 500 stores and determines various statistics in accordance with the present disclosure. The statistics system 500 includes one or more processing units (CPUs) 574, peripherals interface 570, memory controller 588, a network or other communications interface 584, a memory 502 (e.g., random access memory), a user interface 578, the user interface 578 including a display 582 and an input 580 (e.g., a keyboard, a keypad, a touch screen, etc.), input/output (I/O) subsystem 566, one or more communication busses 513 for interconnecting the aforementioned components, and a power supply system 576 for powering the aforementioned components.

In some embodiments, the input 580 is a touch-sensitive display, such as a touch-sensitive surface. In some embodiments, the user interface 578 includes one or more soft keyboard embodiments. The soft keyboard embodiments may include standard (e.g., QWERTY) and/or non-standard configurations of symbols on the displayed icons.

It should be appreciated that statistics system 500 is only one example of a system that may be used in staring and determining various statistics, and that statistics system 500 optionally has more or fewer components than shown, optionally combines two or more components, or optionally has a different configuration or arrangement of the components. The various components shown in FIG. 5 are implemented in hardware, software, firmware, or a combination thereof, including one or more signal processing and/or application specific integrated circuits.

Memory 502 optionally includes high-speed random access memory and optionally also includes non-volatile memory, such as one or more magnetic disk storage devices, flash memory devices, or other non-volatile solid-state memory devices. Access to memory 502 by other components of the statistics system 500, such as CPU(s) 574 is, optionally, controlled by memory controller 588.

Peripherals interface 570 can be used to couple input and output peripherals of the management system to CPU(s) 574 and memory 502. The one or more processors 574 run or execute various software programs and/or sets of instructions stored in memory 502 to perform various functions for the statistics system 500 and to process data.

In some embodiments, peripherals interface 570, CPU(s) 574, and memory controller 588 are, optionally, implemented on a single chip. In some other embodiments, they are, optionally, implemented on separate chips.

In some embodiments, power system 576 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 5, memory 502 of the remote user device preferably stores:

- an operating system 504 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- a positional formation classifier 212 for determining and analyzing formations of players;
- a historical training data store 214 for storing various statistics related to each sport 508, wherein each sport 508 including various team historical data 510 for one or more teams 512, as well as various player statistics 514 for one or more players 516; and
- a situational store 228 for storing data related to formations of players and game situations.

The positional formation classifier 212 (sometimes simply called a formation classifier) provides information related to various states and formations of players at any given point of time in game. For instance, in some embodiments the formation classifier 212 parses telemetry data 230 in order to determine pre-snap formations. Accordingly, once a formation is determined and telemetry data 230 is parsed, sub-categories of the formation may be determined (e.g., an I-formation with different sub-categories defining different running backs). Moreover, in some embodiments the formation classifier 212 acts as a virtual referee and determines if infractions have occurred within a game or play, such as a player being off-sides, a neutral zone infraction, an illegal motion, an illegal formation, and the like. In some embodiments, the formation classifier 212 includes one or more tables of various formations in a football game, such as a first table of offensive formations, a second table of defensive formations, and a third table of special teams formations. In some embodiments, the above table of formations provides some or all of the formations described by Table 1, Table 2, and Table 3.

TABLE 1

| Exemplary Offensive Football Formations |
|---|
| Exemplary Formation |
| Double wing formation |
| Empty backfield formation |
| Goal line formation |
| I formation |
| Pistol formation |
| Pro set formation |
| Short punt formation |
| Shotgun formation |
| Single set back formation |
| Single wing formation |
| T formation |
| Tackle spread formation |
| V formation |
| Victory formation |
| Wing T formation |
| Wishbone formation |

TABLE 2

| Exemplary Defensive Football Formations<br>Exemplary Formation |
|---|
| 38 formation |
| 46 formation |
| 2-5 formation |
| 3-4 formation |
| 4-3 formation |
| 4-4 formation |
| 5-2 formation |
| 5-3 formation |
| 6-1 formation |
| 6-2 formation |
| Seven-man line formation |
| Nickle formation |
| Dime formation |
| Quarter formation |
| Half dollar formation |

TABLE 3

| Exemplary Special Teams Football Formations<br>Exemplary Formation |
|---|
| Field goal formation |
| Kick return formation |
| Kickoff formation |
| Punt formation |

Additionally, in some embodiments the formation classifier 212 determines a ball carrier by comparing telemetry data 230 provided by the ball and telemetry data of a player that is closest to the ball. Likewise, in some embodiments determining which team has possession of the ball is conducted in a similar manner. Furthermore, in some embodiments the formation classifier 212 determines if a player is within a boundary of a game by analyses the telemetry data 230 extracted from the player and comparing this with the known boundaries of the field of play. In this way, the formation classifier 212 parses telemetry data 230 to provide a box score and/or automatic color commentary of a game.

While the formation classifier 212 is labeled a "neural net" it will be appreciated that the formation classifier 212 module does not have to perform classification of team formation using a neural network classifier. In some embodiments the formation classifier 212 module does in fact make use of any classification scheme that can discern a team formation from telemetry data. For instance, in some embodiments formation classifier 212 makes use of a nearest neighbor algorithm to perform the classification of team formation. In other embodiments formation classifier 212 makes use of clustering to perform the classification of team formation. In some embodiments the elucidation of the formation class by formation classifier 212 is used as a covariate in statistical models that predict the outcome of a current live game (e.g., win/loss, point spread, etc.) as disclosed with respect to methods and features described with respect to FIG. 8.

In more detail, in some embodiments, the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm.

By way of non-limiting example the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm. When used for classification, SVMs separate a given set of binary labeled data training set with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space corresponds to a non-linear decision boundary in the input space. Tree-based methods partition the feature space into a set of rectangles, and then fit a model (like a constant) in each one. In some embodiments, the decision tree is random forest regression. One specific algorithm that can serve as the formation classifier 212 for the instant methods is a classification and regression tree (CART). Other specific decision tree algorithms that can serve as the formation classifier 212 for the instant methods include, but are not limited to, ID3, C4.5, MART, and Random Forests.

In some embodiments, the historical data store 214 stores statistics related to each sport 508, each team 510 within the sport league, as well as the respective players 512. As previously described, in some embodiments the data stored in the historical data store 214 is utilized as a training set of data for machine learning engine 210 and/or formation classifier 212. For instance, in some embodiments the data stored in the historical data store 214 is utilized as an initial data set at a start of a league, as in inferred from other data sets of similar league (e.g., using college football stats if a player is a professional rookie), or utilized to create data points if a new statistic is being generated (e.g., a previously unknown statistic becomes relevant). Furthermore, in some embodiments data from a previously played game is stored within the historical data store 214.

In some embodiments, the situation store 228 includes data stored in one or more databases of the machine learning engine 210 as a cache of information. This cache of the situation store 228 allows for data to be queried for and utilized rapidly, rather than having to query each respective database. In some embodiments, the situation store 288 creates a new cache of data for each respective game. However, the present disclosure is not limited thereto.

Figure 6:
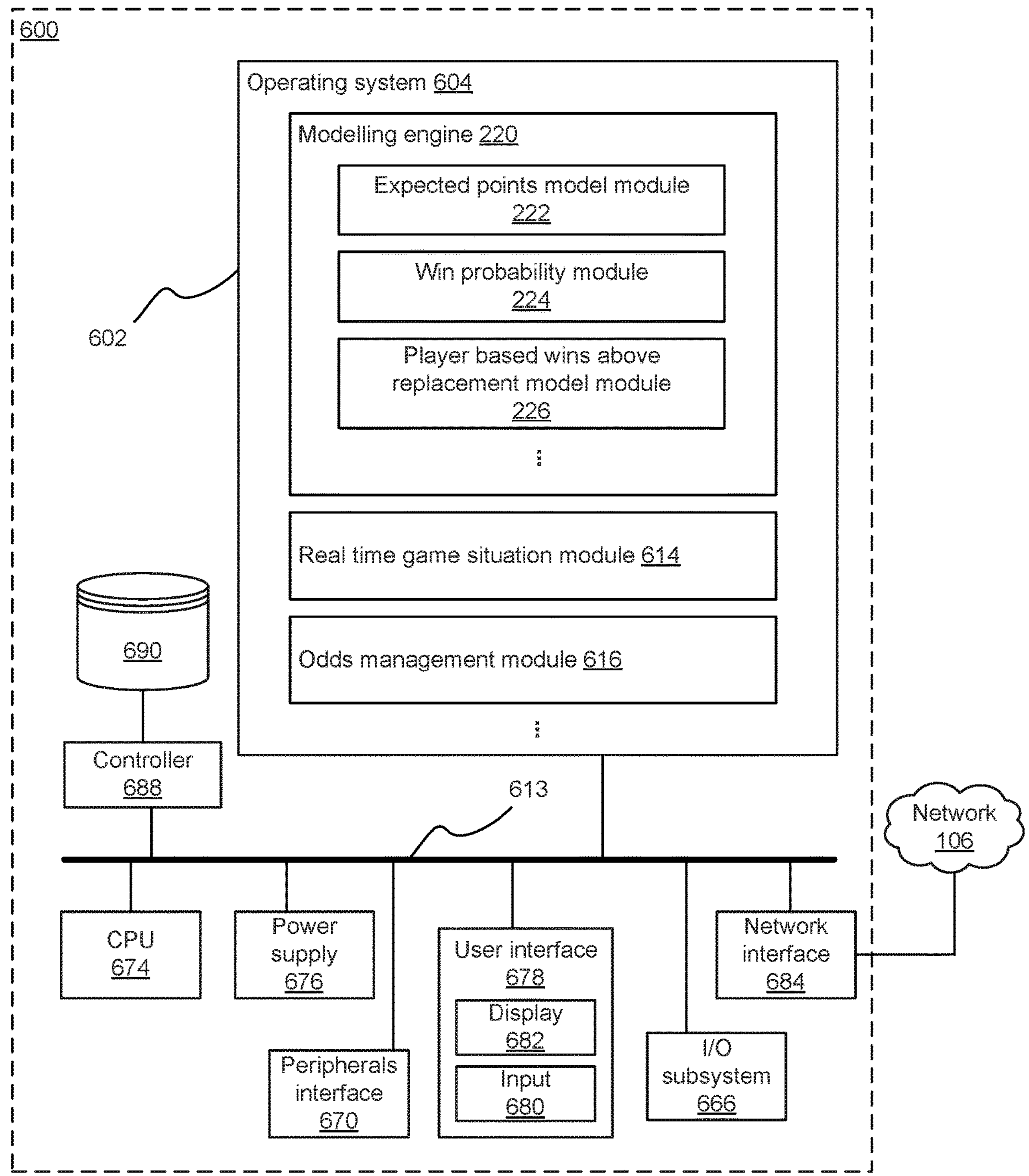
FIG. 6 is a block diagram illustrating an embodiment of an odds management system.

FIG. 6 is a block diagram illustrating an embodiment of an odds management system. Odds management system 600 stores and determines various odds in accordance with the present disclosure. The odds management system 600 includes one or more processing units (CPUs) 674, peripherals interface 670, memory controller 688, a network or other communications interface 684, a memory 602 (e.g., random access memory), a user interface 678, the user interface 678 including a display 682 and an input 680 (e.g., a keyboard, a keypad, a touch screen, etc.), input/output (I/O) subsystem 666, one or more communication busses 613 for interconnecting the aforementioned components, and a power supply system 676 for powering the aforementioned components.

In some embodiments, the input 680 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that odds management system 600 is only one example of a system that may be used in staring and determining various statistics, and that the odds management system 600 optionally has more or fewer components than shown, optionally combines two or more components, or optionally has a different configuration or arrangement of the components. The various components shown in FIG. 6 are implemented in hardware, software, firmware, or a combination thereof, including one or more signal processing and/or application specific integrated circuits.

Memory 602 optionally includes high-speed random access memory and optionally also includes non-volatile memory, such as one or more magnetic disk storage devices, flash memory devices, or other non-volatile solid-state memory devices. Access to memory 602 by other components of the odds management system 600, such as CPU(s) 674 is, optionally, controlled by memory controller 688.

Peripherals interface 670 can be used to couple input and output peripherals of the management system to CPU(s) 674 and memory 602. The one or more processors 674 run or execute various software programs and/or sets of instructions stored in memory 602 to perform various functions for the odds management system 600 and to process data.

In some embodiments, peripherals interface 670, CPU(s) 674, and memory controller 688 are, optionally, implemented on a single chip. In some other embodiments, they are, optionally, implemented on separate chips.

In some embodiments, power system 676 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 6, memory 602 of the remote user device preferably stores:

- an operating system 604 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- a modelling engine 200 for storing one or more prediction or outcome models, the modelling engine including:
  - an expected points model module 222 for determining an expected points value of a scenario in a game,
  - a win probability model 224 for determining a probably of winning a game, and
  - a player based wins above replacement model module 226 for determining;
  - a real time game situation module 614 for receiving and communicating information related to a game currently being conducted; and
  - an odds management module 616 for facilitation management of various odds and betting systems.

As previously described, the modelling engine 200 includes various algorithms and models utilized for generating statistics and predicting outcomes at a sports event. In some embodiments, these models include the expected points model 222 that provides a numerical value for each play of a game. For instance, if a drive in a game that results in a touchdown has plays that include a 5-yard rush, a 94-yard pass, and a 1-yard rush, even though the 1-yard rush resulted in the touchdown the 94-yard pass has a much more significant role in the drive. Thus, in some embodiments the 5-yard rush is allocated an expected points value of 0.5, the 94-yard pass is allocated an expected points value of 5.5, and the 1-yard rush is allocated an expected points value of 1, with high values indicating more important or game defining plays. In some embodiments modelling engine 200 uses the telemetry data collected in accordance with the present disclosure to predict the outcome of a game (e.g., win/loss, point spread, etc.) as disclosed with respect to methods and features described with respect to FIG. 8.

In some embodiments, the real time game situation module 614 receives information related to situations occurring in a game. This information is then utilized in adjusting various weights and values in the above described models. For instance, if a quarterback rolls his ankle and has to take every play from a shotgun position, this immobility of the quarterback will be reflected in the game models 220 through the real time game situation module 614.

Figure 7:
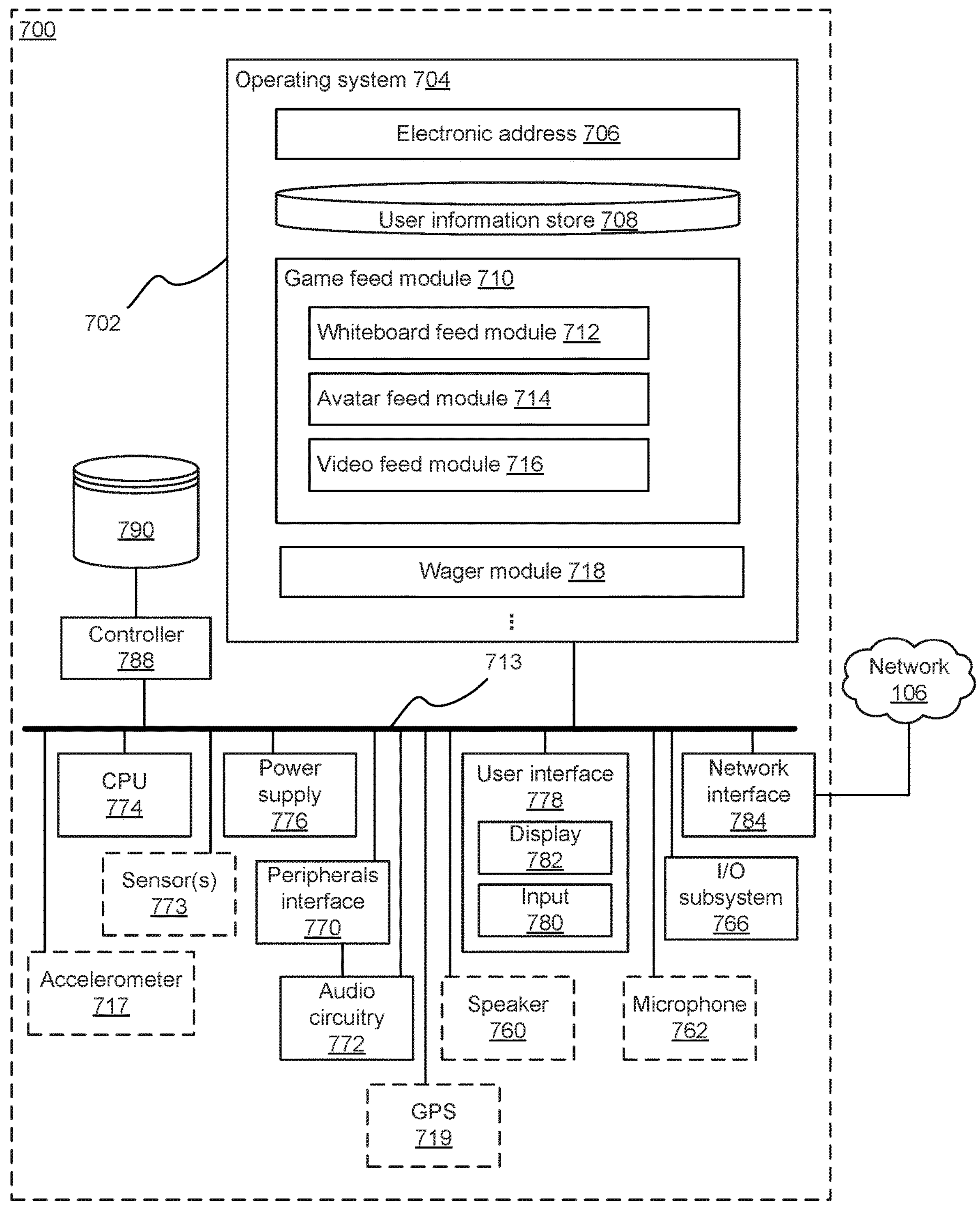
FIG. 7 is a block diagram illustrating an embodiment of a user device.

FIG. 7 is a block diagram illustrating an embodiment of a user device. User device is a remote user device 700 associated with an end user in accordance with the present disclosure. The user device 700 includes one or more processing units (CPUs) 774, peripherals interface 770, memory controller 788, a network or other communications interface 784, a memory 702 (e.g., random access memory), a user interface 778, the user interface 778 including a display 782 and an input 780 (e.g., a keyboard, a keypad, a touch screen, etc.), input/output (I/O) subsystem 766, an optional accelerometer 717, an optional GPS 719, optional audio circuitry 772, an optional speaker 760, an optional microphone 762, one or more optional sensors 764 such as for detecting intensity of contacts on the user device 700 (e.g., a touch-sensitive surface such as a touch-sensitive display system of the device 700) and/or an optical sensor, one or more communication busses 713 for interconnecting the aforementioned components, and a power supply system 776 for powering the aforementioned components.

In some embodiments, the input 780 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that the user device 700 is only one example of a device of a multifunction device that may be used by end users, and that the user device 700 optionally has more or fewer components than shown, optionally combines two or more components, or optionally has a different configuration or arrangement of the components. The various components shown in FIG. 7 are implemented in hardware, software, firmware, or a combination thereof, including one or more signal processing and/or application specific integrated circuits.

Memory 702 optionally includes high-speed random access memory and optionally also includes non-volatile memory, such as one or more magnetic disk storage devices, flash memory devices, or other non-volatile solid-state memory devices. Access to memory 702 by other components of the user device 700, such as CPU(s) 774 is, optionally, controlled by memory controller 788.

Peripherals interface 770 can be used to couple input and output peripherals of the management system to CPU(s) 774 and memory 702. The one or more processors 774 run or execute various software programs and/or sets of instructions stored in memory 702 to perform various functions for the user device 700 and to process data.

In some embodiments, peripherals interface 770, CPU(s) 774, and memory controller 788 are, optionally, implemented on a single chip. In some other embodiments, they are, optionally, implemented on separate chips.

In some embodiments, audio circuitry 772, speaker 760, and microphone 762 provide an audio interface between a user and the device 700. The audio circuitry 772 receives audio data from peripherals interface 770, converts the audio data to an electrical signal, and transmits the electrical signal to speaker 760. Speaker 760 converts the electrical signal to human-audible sound waves. Audio circuitry 772 also receives electrical signals converted by microphone 762 from sound waves. Audio circuitry 772 converts the electrical signal to audio data and transmits the audio data to peripherals interface 770 for processing. Audio data is, optionally, retrieved from and/or transmitted to memory 702 and/or RF circuitry 784 by peripherals interface 770.

In some embodiments, power system 776 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 7, memory 702 of the remote user device preferably stores:

- an operating system 704 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- an electronic address 706 that is used to identify a particular user device during communications with various systems and devices of the present disclosure;
- a user information store 708 that stores pertaining information related to the respective user associated with the corresponding user device 700, such as user access information including usernames, user passwords, access tokens, etc.;
- a game feed module 710 for viewing various representations of a game including a whiteboard feed module 712, an avatar feed module 714, and a video feed module 716 as well as viewing various statistics related to the game; and
- a wager module 718 that facilitates placing wagers on game scenarios.

Figure 8:
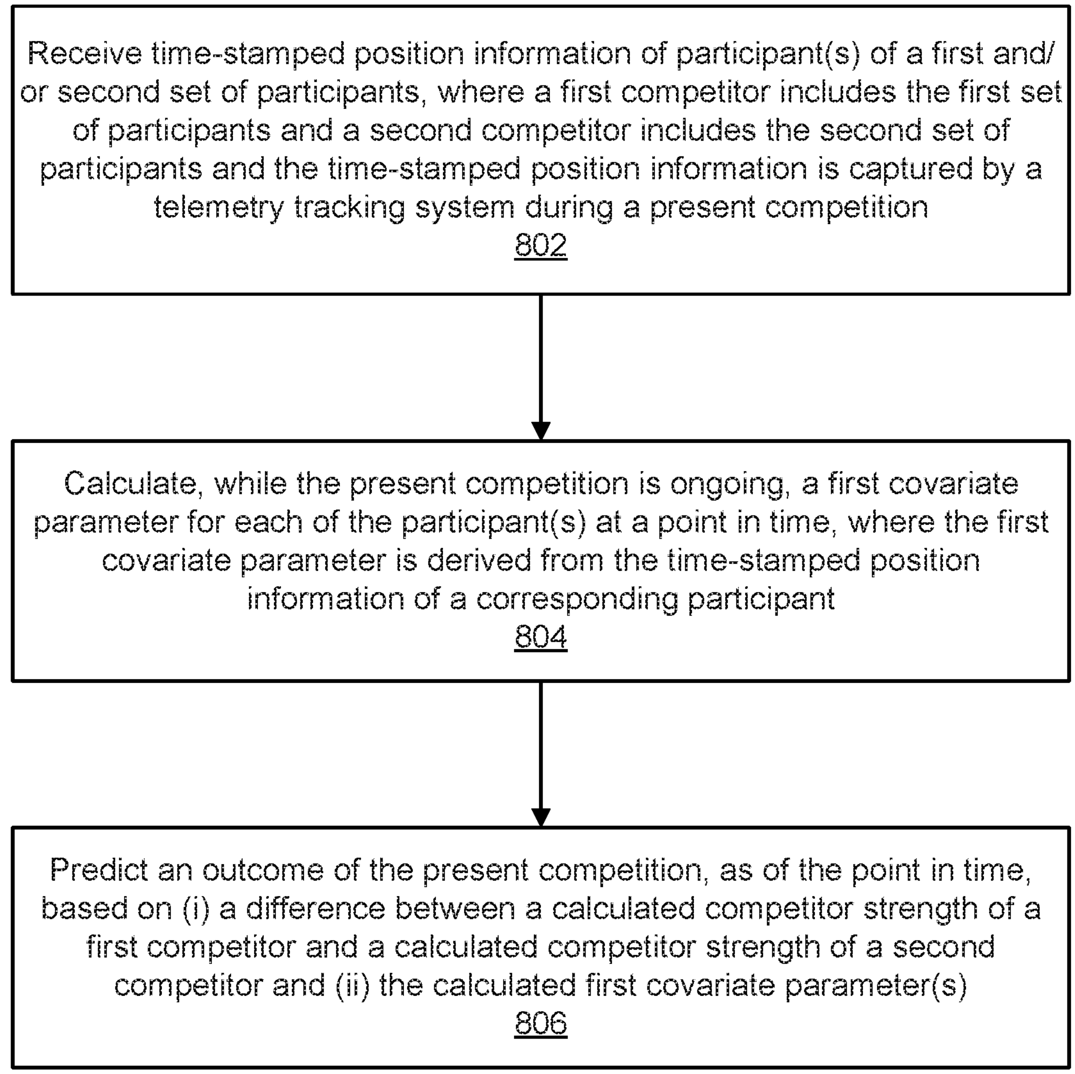
FIG. 8 is a flow chart illustrating an embodiment of a process for predicting a future outcome at a live sport event using extended covariates.

In some embodiments wager module 718 uses the telemetry data collected in accordance with the present disclosure to predict the outcome of a current game using extended covariants (e.g., win/loss, point spread, etc.), as disclosed with respect to methods and features described with respect to FIG. 8. In some embodiments, wager module 718 uses the telemetry data collected in accordance with the present disclosure to provide odds for future game events in a current live game.

Figure 9:
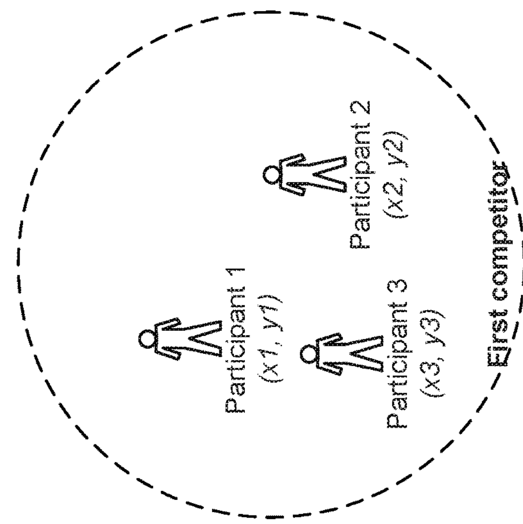
FIG. 9 shows an example of a 3-on-3 basketball game in which a future outcome is predicted using extended covariates.
Figure 9:
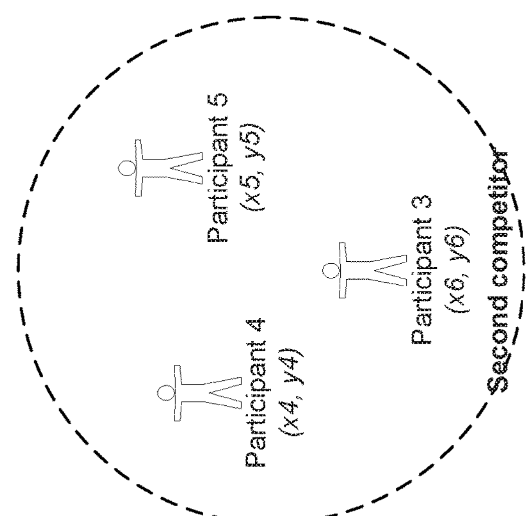

Now that a general topology of the system 48 has been described, methods for predicting an outcome of a present game using extended covariates will be described with reference to, at least, FIGS. 1 through 7 and FIG. 9. FIG. 9 shows an example of a 3-on-3 basketball game in which a future outcome is predicted using extended covariates. In this example, the first competitor is a first team, the second competitor is a second team, the first set of participant(s) includes a plurality of participants, the second set of participant(s) includes a plurality of participants, and the present competition is a game. More specifically, participants 1-3 belong to the first competitor and participants 4-6 belong to the second competitor.

FIG. 8 is a flow chart illustrating an embodiment of a process for predicting a future outcome at a live sport event using extended covariates. This process may be implemented by processor 100 in cooperation with the other devices described above. The process can be performed to predict an outcome of a competition between a first competitor that includes a first set of one or more participants and a second competitor that includes a second set of one or more participants.

The process begins at 802 by receiving time-stamped position information of one or more participants of one or both of the first set of participant(s) and the second set of participant(s) in the competition, the time-stamped position information captured by a telemetry tracking system during the competition. Referring to FIG. 9, the telemetry data for each participant is his x,y coordinate position.

An example of a telemetry tracking system is the tracking device management system 400 facilitating managing of one or more tracking devices 300 and one or more anchor devices 120 of the system, described above with respect to FIG. 1. The telemetry tracking system includes a plurality of tracking devices configured to provide a plurality of signals. Each respective participant in the first and second plurality of participants is uniquely and independently associated with at least a pair of tracking devices in the plurality of tracking devices. The telemetry tracking system also includes a set of three or more receivers (anchor devices) configured to receive the plurality of signals.

The telemetry tracking system also includes a computer system (e.g., the tracking device management system 400 in FIG. 4) configured to determine, on a recurring basis using the received plurality of signals, a time-stamped position for each player of the and second plurality of players, thereby obtaining time-stamped position information in the form of an independent plurality of time-stamped positions for each respective player in the first and second plurality of players. In some embodiments, a tracking device is attached to player's gear, e.g., a shoulder pad, or a helmet. In some embodiments, a tracking device is attached to each of the shoulder pads. Such configuration of the pair of the tracking devices is configured to provide telemetry data including direction that the respective player is facing, as well as telemetry data capturing rotational movement and/or directional movement. For example, the telemetric tracking system captures not only a running direction but also if the player is running facing forward, sideways or backwards. The telemetric tracking system also captures turns, rotations, falls, etc. of a player. The tracking device includes a power source (e.g., a battery), a transmitter for transmitting wireless signals and means for attaching the tracking device to player's gear (e.g., a strap). The set of three or more receivers are located to have reception across the predefined area, e.g., a football field. In some embodiments, a tracking device is also attached to the ball, e.g., providing information about the speed of the ball, or a distance travelled by the ball during a throw or a kick. In various embodiments, the time-stamped position information captured by a telemetry tracking system includes position data of a ball or other equipment other than a player.

In some embodiments, the plurality of signals conforms to an Ultra-wideband (UWB) standard. Each signal in the plurality of signals has a bandwidth of greater than 500 MHz or a fractional bandwidth equal to or greater than 0.20. Each signal in the plurality of signals is within 3.4 GHz to 10.6 GHz. Each tracking device in the plurality of tracking devices has a signal refresh rate of between 1 Hz and 60 Hz (e.g., each tracking device emits 1, 5, 10, 15, 20 signals per second). Each tracking device of the plurality of tracking devices sends a unique signal identifying a respective tracking device, or optionally, biometric data specific to a respective player associated with the respective tracking device. In some embodiments, a tracking device is configured to communicate with a biometric monitoring device (e.g., a heart rate monitoring device attached to a respective player) and the biometric data includes biometric data captured by the biometric monitoring device. In some embodiments, the unique signal includes information about the respective tracking device, such as battery level.

Each time-stamped position in the independent plurality of time-stamped positions for a respective player of the first or second plurality of players includes a xyz-coordinate of the respective player with respect to a predefined space. In some embodiments, the xyz-coordinate has an accuracy ranging from ±5 centimeters to ±30 centimeters. In some embodiments, the xyz-coordinate has an accuracy of ±15 centimeters. In some embodiments, the league is a football league, the present game is a football game, and the predefined space is a football field at which the present game is being played.

Returning to FIG. 8, at 804, the process calculates a first covariate parameter (e.g., covariates listed in Table 4 or Table 5) for each of the participant(s) at a point in time, where each respective first covariate parameter is derived from the time-stamped position information of a corresponding participant of the first or second set of one or more participants in the present competition at the point in time. The covariate parameter is calculated while the competition is ongoing in some embodiments.

In various embodiments, the first covariate parameter corresponding to a first participant included in the first set of participant(s) is determined based at least in part on position information of the first participant relative to one or more participants included in the second set of participant(s). The first covariate parameter is calculated at least in part by using position information to calculate a derivative with respect to time including at least one of velocity, acceleration, and jerk.

At 806, the process predicts the outcome of the competition, as of the point in time, based at least in part on (i) a difference between a calculated competitor strength of the first competitor and a calculated competitor strength of the second competitor and (ii) the calculated first covariate parameter(s). In various embodiments, the difference between a calculated competitor strength of the first competitor and a calculated competitor strength of the second competitor is calculated based at least in part on historical data associated with the first and second competitors, respectively.

The outcome of the present game can be expressed in a variety of ways. In various embodiments, the outcome of the present game is a predicted winner. In such instances, the outcome is provided as values for each of the teams. For example, the value for team j as a value "1" if team j wins the present game, "0.5" if the present game ends in a tie, and a "−1" if team j loses the present game and the value for team k as a value "1" if team k wins the present game, "0.5" if the present game ends in a tie, and a "−1" if team k loses the present game.

In various embodiments, the outcome is a predicted final score difference at the end of the present game from the perspective of either of the competing teams. In various embodiments, the outcome is a predicted final score difference at the end of the present game from the perspective of either of the competing teams.

Figure 10:
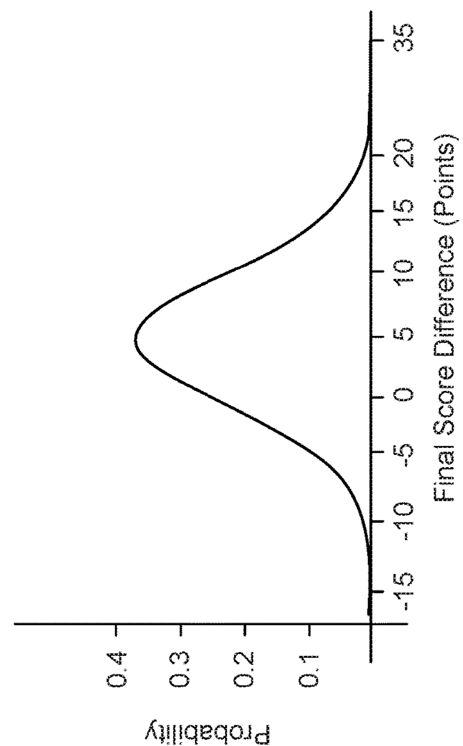
FIG. 10 shows an example of a predicted outcome of a competition.

FIG. 10 shows an example of a predicted outcome of a competition. FIG. 10 corresponds to the FIG. 9, which is a 3-on-3 basketball game, and shows the probability of the game resulting in various point differentials labeled on the x-axis. In this scenario, at 3:12 into the game, the collected telemetry data indicates that the first competitor is stronger than the second competitor so the normal distribution is centered around +5 points meaning that the first competitor is likely to more likely than not to either tie or win by up to 10 points. This continuous distribution can be updated throughout the game and naturally may change as player strengths and team strengths change over the course of the game. As further described herein, the factors affecting player and team strengths are modeled by extended covariates.

The strength of a team and differences between teams can be evaluated in variety of ways. One way to evaluate team strength $\Theta=(\theta_1, \theta_2, \ldots, \theta_J)$ (J=total number of teams, e.g., 32 for the NFL) uses historical win/loss data as discussed in "*Handbook of Statistical Methods and Analyses in Sports*," Chapter 5 titled "*Estimating Team Strength in the NFL*," by Glickman and Stern, Taylor & Francis, Dec. 20, 2016.

The difference in team strengths can be evaluated while considering extended covariates. For example, a covariate parameter is derived from time-stamped position information of a corresponding player in the present game. Using the example of football, the players include a quarterback (QB), a running back (RB), a wide receiver (WR), a tight end (TE), a center (C), an offensive guard (OG), an offensive tackle (OT), a middle linebacker (MLB), an outside linebacker (OLD), a defensive end (DE), a defensive tackle (DT), a cornerback (CB), a safety (S), a kicker (K), a holder (H), a long snapper (LS), a punter (P) or kick/punt returner (KR/PR).

In various embodiments, the process predicts the outcome including by comparing a first value for the first covariate parameter calculated for the first competitor with a second value for the first covariate parameter calculated for the second competitor.

Comparing the first value for the first covariate parameter with the second value for the first covariate parameter includes calculating a difference between the first value and the second value.

For example, the process calculates the difference between the first competitor strength and the second competitor strength based at least in part on the historical data, wherein the historical data includes win/loss data among a plurality of competitors comprising a set of competitors. In various embodiments, the process retrieves, from a computer system (e.g., distributed computing system 48 described above with respect to FIG. 1A), win/loss data for a plurality of historical games (e.g., the historical training data 214), for each respective pair of participating teams in the plurality of teams.

In various embodiments, the prediction of the outcome of the present game, as of a time point, is performed by evaluating a continuous distribution centered at a point that is determined by the difference between team strengths (e.g., based upon the win-loss data), and each covariate parameter. Examples of a continuous distribution include a normal distribution, a t-distribution, a unimodal continuous distribution, and a real-valued distribution, among others.

A team strength $\theta_j$ of an arbitrary team j is considered to be a scalar parameter that is evaluated based on historical game results, and a prediction for a game outcome between teams j and k depends on $\theta_j$-$\theta_k$. In other words, The difference between the calculation of the team strength of the first team (e.g., team j) for the present game and the calculation of the team strength of the second team (e.g., team k) for the present game is computed as $\theta_j$-$\theta_k$. In a set of n games, $y_i$ is an outcome of game i played between teams $j_i$ and $k_i$, y is a vector of all historical game outcomes ($y=y_1, y_2, \ldots, y_n$), where the outcome)), is defined as a final score difference in the game from the perspective of team $j_i$.

Team strength $\theta_j$ is estimated by minimizing the sum of squared differences as shown in Equation 1:

$$SS((\theta|y)=\Sigma_{i=1}^{n}(y_i-(\theta_{j_i}-\theta_{k_i}))^2 \quad (1)$$

Team strength $\theta_j$ may be interpreted as team j's mean margin of victory plus the mean strength of the opponents. Larger $\theta_j$ corresponds to a relatively better team than smaller $\theta_j$. Equation 1 may be represented in matrix form by defining matrix X as an n×J matrix encoding the identities of teams competing across the n games such that the $i^{th}$ tow of X encodes information about game i. The competing teams are indicated as elements set to 1 and −1, where remaining elements are set to 0. An example of matrix X is defined as:

$$X = \begin{pmatrix} 1 & 0 & -1 & 0 & 0 & \ldots & 0 \\ 0 & 0 & 1 & 0 & -1 & \ldots & 0 \\ -1 & 0 & 0 & 0 & 1 & \ldots & 0 \\ \vdots & \vdots & \vdots & \vdots & \vdots & \ddots & \vdots \\ 0 & -1 & 0 & 0 & 0 & 0 & 1 \end{pmatrix}$$

where the first game includes teams 1 and 3, the second game includes teams 3 and 5, etc. A vector describing the strength differences for each game is formed from XΘ

$$\begin{pmatrix} 1 & 0 & -1 & 0 & 0 & \ldots & 0 \\ 0 & 0 & 1 & 0 & -1 & \ldots & 0 \\ -1 & 0 & 0 & 0 & 1 & \ldots & 0 \\ \vdots & \vdots & \vdots & \vdots & \vdots & \ddots & \vdots \\ 0 & -1 & 0 & 0 & 0 & 0 & 1 \end{pmatrix} \begin{pmatrix} \theta_1 \\ \theta_2 \\ \vdots \\ \theta_j \end{pmatrix} = \begin{pmatrix} \theta_1-\theta_3 \\ \theta_3-\theta_5 \\ \theta_5-\theta_1 \\ \vdots \\ \theta_j-\theta_2 \end{pmatrix}$$

which can be re-expressed in matrix notation as Equation 2:

$$SS((\Theta|y)=(y-X\Theta)'(y-X\Theta). \quad (2)$$

Equation 2 is the sum of squared residuals for linear regression with matrix X and the unique least-squares estimate $\hat{\Theta}$ of Θ is given as $\hat{\Theta}=(X'X)^{-1}X'y$ when X'X is invertible. However, X'X is not invertible because the columns of X are linearly dependent as the sum of elements across every row is 0. The linear dependence of X can be addressed by imposing linear constraint on θ. The constraint does not change the essential solution to the optimization of Θ, but rather forces the selection of one solution among the infinite number in the unconstrained version. The constraint can be implemented by re-expressing XΘ as $X^*\Theta_{-J}$, where $\Theta_{-J}$ is the vector of length J−1 of team strengths with $\theta_j$ removed and X* is the n×(J−1) design matrix that accounts for the linear constraint implemented on Θ. This requires construction of a J×(J−1) contrast matrix W satisfying X*=XW. The relation implies that Equation 3 is satisfied when $W\Theta_{-J}=\Theta$:

$$X^*\Theta_{-j}=XW\Theta_{-j}=X\Theta, \quad (3)$$

The least-squares estimate $\hat{\Theta}_{-J}$ is given by equation 4:

$$\hat{\theta}_{-J}=(X^{*\prime}X^{*})^{-1}X^{*\prime}y \quad (4)$$

Any least-squares estimate of Θ satisfies X'XΘ-X'y, where X'y is the vector of J elements in which the jth element is the sum of the score differences for the games team j won les the sum of the score differences of the games team j lost. For θj, Equation 4 can be solved as Equation 5a for j, and similarly as Equation 5b for k:

$$\theta_j = \frac{\sum_{q \neq j} n_{jq}\theta_q}{\sum_{q \neq j} n_{jq}} + \frac{\sum_{i:j\ wins} |y_i| - \sum_{i:j\ losses} |y_i|}{\sum_{q \neq j} n_{jq}}, \quad (5a)$$

$$\theta_k = \frac{\sum_{q \neq k} n_{kq}\theta_q}{\sum_{q \neq k} n_{kq}} + \frac{\sum_{i:k\ wins} |y_i| - \sum_{i:k\ losses} |y_i|}{\sum_{q \neq k} n_{kq}}, \quad (5b)$$

$n_{jq}$ is the number of times the first team j and a team q in the league have competed in the plurality of historical games, and $n_{kq}$ is the number of times the second team k and a team q in the league have competed in the plurality of historical games.

The model described herein uses an approach to evaluate score differences of historical games by normal distributions centered at the difference in team strength parameters, (e.g., $\theta_j$-$\theta_k$). The normal distribution provides a continuous approximation to the probability distribution of score differences that is convenient to model. The distribution model fits historical win/loss data between teams j and k to fit a model expressed by Equation 6:

$$y_i \sim N(\theta_{j_i}-\theta_{k_i},\sigma^2), \quad (6)$$

where $y_i$ is the score difference for game I with teams $j_i$ and $k_i$ competing, $\theta_j$ is the calculation of the team strength of team j upon the win/loss data of historical games, $\theta_k$ is the calculation of the team strength of team k based upon the win/loss data of historical games (see, Equations 5a and 5b above) and $\sigma^2$ is the residual variance. Equation 6 has a mean defined by the win/loss data of historical games. The normal distribution described by Equation 6 is centered at a score difference depending on the historical win/loss results. For example, Equation 6 is centered at 0 in a situation where teams j and k have equal number of wins in historical games where the teams have competed against each other (e.g., the teams have equal evaluated team strengths based on the historical win/loss data). In such cases the predicted probability for team j to win a present game is 50%. As another example, Equation 6 is centered away from the center when either of the teams have more wins that the other team (e.g., one team has a higher team strength than the other team based on the historical win/loss data). Equation 6 may be expressed in a vector form by Equation 7:

$$y \sim N(X\theta, \theta^2 I), \tag{7}$$

where X is defined in Equation 2 and I is the identity matrix of dimension n. An unbiased estimate of the residual variance $\sigma^2$ is provided by Equation 8, including $\hat{\Theta}$ with the linearly constrained estimate provided in Equation 5:

$$\hat{\sigma}^2 = \frac{1}{n-(J-1)}\left(y - X\,\hat{\Theta}\right)'\left(y - X\,\hat{\Theta}\right). \tag{8}$$

The estimated covariance matrix for J-dimensional 0 is computed as shown in Equation 9:

$$\widehat{Var}(\hat{\theta}) = \widehat{Var}(W\hat{\theta}_{-j}) = W\widehat{Var}(W\hat{\theta}_{-j})W' = \widehat{\sigma^2}\, W(X^{*\prime}X^*)^{-}{}_1 W. \tag{9}$$

The model described herein is extended in various embodiments to incorporate game-specific or team-specific covariate information including internal and external covariates (e.g., extended covariates). As used herein, external covariates include parameters that may influence the end results of a game, but are external to team's strength. The external covariates include, for example, weather or schedule related parameters, or location of the game (home vs. away). As used herein, internal covariates include parameters describing a team's strength, such as parameters related to team's performance.

In various embodiments, extending the above described model with covariates includes determining average values of specific variables for the competing teams, and considering the difference between the averages when evaluating team strengths. For example, the model includes determining average rushing yards for teams j and k, and considering the difference between the average rushing yards. Equation 6 can be modified to include covariates h, described with vector $h_i$, as shown in Equation 10:

$$N(\theta_j - \theta_k + h_i, \sigma^2), \tag{10}$$

where $\sigma^2$ is the variance of $\theta_j - \theta_k + h_i$ in the normal, $\theta_1$ is the calculation of the team strength of team j upon the win/loss data of historical games, $\theta_k$ is the calculation of the team strength of team k based upon the win/loss data of historical games, and $h_i$ is a quantification of the covariate parameter. In various embodiments, the quantification of the covariate parameter as in Equation 10 shifts the center of the normal distribution described by Equation 6. For example, if covariate $h_i$ corresponds to a value that is more favorable to team j, covariate $h_i$ shifts the center of the normal distribution toward the probability that team j will win and if covariate corresponds to a value that is more favorable to team k, covariate $h_i$ shifts the center of the normal distribution toward the probability that team k will win.

In order to evaluate a win probability from the normal distribution of Equation 10 including the covariate, in various embodiments Equation 10 is reduced to a model of standard normal distribution with Z-formula:

$$Z = \frac{(\theta_j - \theta_k + h_i) - \mu}{\sigma}, \tag{11}$$

where $\mu$ is the mean of $\theta_j - \theta_k + h_i$ and $\mu$ is the standard deviation (i.e., a square root of variance $\sigma^2$ Z-values of a standard normal distribution are associated with specific cumulative probabilities, e.g., using standard Z-score tables (e.g., see, "*Statistical Reasoning*," Chapter 7.1 *"The Normal Probability Table*," by G. Smit, Alyn and Bacon, Needham Mass., 1991).

Equation 10 may be expressed in matrix form as:

$$y \sim N\left((X \mid H)\begin{pmatrix}\theta \\ \beta_h\end{pmatrix}, \delta^2\right),$$

where H is the matrix with rows $h_i$ and $\beta_h$ is a vector corresponding to $h_i$. Equation 10 is a normal linear model, and therefore inference for the parameters may be obtained through least-squares regression, taking into account the collinearity with X* described above. Similarly to Equation 9 above, the covariate matrix of estimates for $\hat{\Theta}$ and $\hat{\beta}$ can be obtained by defining $$\hat{\eta} = \binom{\theta}{\beta_h} \text{ and } \widehat{\eta_{-j}} = \binom{\theta_{-j}}{\beta_h} \text{ and}$$

$$W = \begin{pmatrix} W & 0 \\ 0 & I_h \end{pmatrix},$$

where $I_h$ is an identity matrix having dimensions equal to the number of variables in h. Then the covariance matrix of estimates becomes Equation (12):

$$\widehat{Var}(\hat{\eta}) = \widehat{Var}(\hat{\eta}_{-j}) = \tilde{W}\widehat{Var}(\hat{\eta}_{-j})\tilde{W}'. \tag{12}$$

In some embodiments the continuous distribution is modeled as a normal distribution. The distribution is centered on the point $\theta_j + \theta_k + h_i$, and the distribution is evaluated as $N(\theta_j + \theta_k + h_i, \sigma^2)$ (see, Equation 10), where $\theta_j$ is the calculation of the team strength of the first team based upon the win/loss data for the plurality of historical games, $\theta_k$ is the calculation of the team strength of the second team based upon the win/loss data for the plurality of historical games, $h_i$ is a quantification of the first covariate parameter, and $\sigma^2$ is the variance of –/+ in the normal distribution. For example, the win/loss data for the plurality of historical games includes sport historical data 510 described above with respect to FIG. 5.

In some embodiments, $$\theta_j = \frac{\sum_{q \neq j} n_{jq}\theta_q}{\sum_{q \neq j} n_{jq}} + \frac{\sum_{i:\, j\ wins} |y_i| - \sum_{i:\, j\ losses} |y_i|}{\sum_{q \neq j} n_{jq}}, \tag{5a}$$

-continued $$\theta_k = \frac{\sum_{q \neq k} n_{kq}\theta_q}{\sum_{q \neq k} n_{kq}} + \frac{\sum_{i:k\ wins} |y_i| - \sum_{i:k\ losses} |y_i|}{\sum_{q \neq k} n_{kq}}, \tag{5b}$$

where $n_{jq}$ is the number of times the first team j and a team q in the league have competed in the plurality of historical games, and $n_{kq}$ is the number of times the second team k and a team q in the league have competed in the plurality of historical games. In some embodiments the first covariate parameter is selected from Table 4 above for a football game. In some embodiments more than one covariate parameter is used. In some such embodiments, some of the covariate parameters do not require the telemetry data. An example of a covariate that does not require the telemetry data is an age or draft pick number of a player.

For example, player historical data 514 described above with respect to FIG. 5 includes a plurality of covariate parameters for players 1 to W of each team. Each respective covariate parameter in the plurality of covariate parameters is derived from time-stamped position information of the corresponding player in the present game through the first time point.

In some embodiments, the continuous distribution is modeled as a normal distribution. The difference between the calculation of the team strength of the first team for the present game and the calculation of the team strength of the second team for the present game is computed as $\theta_j-\theta_k$, the distribution is centered on the point $\theta_j-\theta_k+h_i$, and the distribution is evaluated as $N(\theta_j-\theta_k+h_i, \sigma^2)$ (see, Equation 10 above), where $\theta_j$ is the calculation of the team strength of the first team based upon the win/loss data for the plurality of historical games, $\theta_k$ is the calculation of the team strength of the second team based upon the win/loss data for the plurality of historical games, $h_i$ is a collective quantification of each covariate parameter in the first plurality of covariate parameters, and $\sigma^2$ is the variance of $\theta_j-\theta_k+h_i$ in the normal distribution.

In some embodiments, $$\theta_j = \frac{\sum_{q \neq j} n_{jq}\theta_q}{\sum_{q \neq j} n_{jq}} + \frac{\sum_{i:j\ wins} |y_i| - \sum_{i:j\ losses} |y_i|}{\sum_{q \neq j} n_{jq}}, \quad \text{(see, Equation 5a)}$$

-continued $$\theta_k = \frac{\sum_{q \neq k} n_{kq}\theta_q}{\sum_{q \neq k} n_{kq}} + \frac{\sum_{i:k\ wins} |y_i| - \sum_{i:k\ losses} |y_i|}{\sum_{q \neq k} n_{kq}}, \quad \text{(see, Equation 5b)}$$

where $n_{jq}$ is the number of times the first team j and a team q in the league have competed in the plurality of historical games, and $n_{kq}$ is the number of times the second team k and a team q in the league have competed in the plurality of historical games. In some embodiments, the present game is a football game and each covariate parameter in the first plurality of covariate parameters is selected from Table 4 or Table 5.

Extending a prediction model to include covariates derived from participant-specific information, such as positional data generated by a telemetry tracking system as described herein and/or historical statistics for specific participants, is disclosed.

Table 4 includes examples of internal covariates derived from a play-by-play data derived from a telemetry tracking system in some embodiments, such as a telemetry tracking system described with respect to FIGS. 1-7 for a football game. For example, a quarterback of a team is evaluated by covariates including aggressiveness and/or distance between a player and the quarterback per pass attempt. A wide receiver of a team is evaluated by covariates including cushion between the receiver and defensive backs, a distance travelled, a percentage outbreaking route, and yardage per route. A tight end of a team is evaluated by covariates including pulls, a percentage outbreaking route, missed blocks, and a distance travelled. In some embodiments, the internal covariates include variables derived from historical play-by-play data, such as that published by the NFL.

In various embodiments, the covariate parameters can be based on one or more of telemetry of a present competition, historical telemetry, telemetry associated with one or more competitors, and/or external factors (external to one or more competitors) such as weather, among other things.

Table 5 summarizes variables published by the NFL used for evaluating players and/or team strength. In some embodiments, the internal covariates for evaluating the team strengths include (i) a season-to-date summary of the passing yards, (ii) a season-to-date summary of the rushing yards, (iii) a season-to-date fumble rate, and (iv) a season-to-date interception rate.

TABLE 4

Covariates derived from play-by-play telemetric data.

| Statistic (Covariate) | Derivation | Analytical Use |
|---|---|---|
| Aggressiveness of player | Determined, at least, by comparing completion rate of QB with respect to a distance between a receiver and a defensive player. | Determines probability of quarterback attempting a pass in a high risk situation etc. |
| Average velocity, acceleration, jerk | Determined, at least, by derivatives of positional telemetry data of each respective player or accelerometer. | Determines player fatigue throughout a game, determines optimal offensive and defensive player matchups, agility of a player, etc. |
| Ball distance | Determined, at least, by positional telemetry data. | Determines lateral movement in comparison to actual yardage (e.g.., a lateral vs a forward pass), etc. |
| Ball speed | Determined, at least, by derivative of positional telemetry data of the ball. | Determines quarterback throwing speed, etc. |

TABLE 4-continued

| Covariates derived from play-by-play telemetric data. | | |
|---|---|---|
| Statistic (Covariate) | Derivation | Analytical Use |
| Blocking assignment expectations | Determined, at least, by comparing formation of players before each play, throughout each player, and/or after each play to determine each expected blocking assignment for a respective formation. | Determines expected blocking assignments to predict a screen, a rushing gap, etc. |
| Burst speed from line of scrimmage | Determined, at least, by telemetry data received from each player after crossing the line of scrimmage. | Determines how quickly a rusher can break through the line of scrimmage (e.g., a lower burst yields a lower probability of sack), etc. |
| Coverage type | Determined, at least, by comparing telemetry data for each respective offensive and/or defensive formation. | Determines probability of a zone coverage or man coverage by offensive formation and/or defensive formation, etc. |
| Cushion between players | Determined, at least, by comparing telemetry data from an offensive player and a defensive player for a respective play. | Determines probability and/or size of a distance between two or more respective players in a play (e.g., probability a receiver creates a gap between a defensive player), etc. |
| Defenders in Box | Determined, at least, by telemetry data from one or more defensive players at a start of a play. | Determines probability of formation, coverage type, and expected formation progression during a play, etc. |
| Distance between player and quarterback per pass attempt | Determined, at least, by comparing telemetry data from one or more players and the quarterback. | Determines pressure on quarterback, effectiveness of offensive line, etc. |
| Distance between relative players | Determined, at least, by comparing telemetry data from two or more players. | Determines best matchups between players, pressure on quarterback, etc. |
| Distance travelled | Determined, at least, by telemetry data from a respective player. | Determines lateral movement (e.g.., a north to south running back versus a speed back), total distance covered by a player per play, per game, etc. |
| Double-team percentage | Determined, at least, by telemetry data from two or more respective players. | Determines double team efficiency per player and/or per opponent, probability of a double team for each formation, etc. |
| Positional heat maps | Determined, at least, by mapping telemetry data over a period of time | Determines normalized progression of each player's position on the field for each respective play and/or game. |
| Formation success in huddle and/or in hurry-up situation | Determined, at least, by comparing telemetry data of one or more players at a start of a play with a result of the play. | Determines success rate of using a huddle and/or hurry up offensive for each player, each formation, etc. |
| Broken tackles | Determined, at least, by comparing telemetry data of two or more players during a respective play. | Determines probability a player will break a tackle, determines optimal tackling position (e.g., a high tackle, a low tackle, etc.), etc. |
| Hurdles Expectancy | Determined, at least, by comparing telemetry data of two or more players during a respective play (e.g., two opposing players having same X, Y telemetry data but different Z telemetry data at a particular point in time. | Determines probability of a player attempting a hurdle (e.g., a hurdle in an open field, a quarterback leap), success rate of hurdling, etc. |
| Defender coverage type | Determined, at least, by mapping defensive telemetry data over a period of time for each respective play. | Determines probability a defender using a press coverage, a deep coverage, for each formation. |
| Max speed | Determined, at least, by detecting a highest velocity of a respective player. | Determines optimal matchups against respective players and/or respective routes, player fatigue, etc. |

TABLE 4-continued

| Covariates derived from play-by-play telemetric data. | | |
|---|---|---|
| Statistic (Covariate) | Derivation | Analytical Use |
| Missed blocks | Determined, at least, by comparing telemetry data of two opposing players over a period of time during a play. | Determines a missed block occurrences. |
| Probability of blocking, running, and/or receiving during a passing play | Determined, at least, by mapping telemetry data of one or more players during each respective play. | Determines probability of a running back blocking, receiving, or running for each respective formation, etc. |
| Probability of a completion | Determined, at least, by comparing telemetry data of one or more players at a start of a play. | Determines preferred routes for receivers, probability of a completion per route, per formation, per opposing player matchups, etc. |
| Probability of breaking route | Determined, at least, by mapping telemetry data over a period of time. | Determines probability of a pass and/or route being an out-breaking route (e.g., towards a side line) or an in-breaking route (e.g, towards a middle of a field), etc. |
| Probability of open receiver | Determined, at least, by comparing telemetry data for each receiving and each defender for a respective formation. | Determines how often each receiver is open for each route and/or against each defender (e.g, success rate in man coverage against a respective defender), etc. |
| Probability of blitz | Determined, at least, by comparing telemetry data of one or more players at a start of a play. | Determines expected defense blitz tendency for each respective formation (e.g, probability of blitz in a passing formation, probability of blitz in a rushing formation, etc.), etc. |
| Third downs played | Determined, at least, by comparing telemetry data of one or more players with a game clock. | Determines if a player is used in third down situations (e.g, an RB is a "third down back"), etc. |
| Probability of rushing direction | Determined, at least, by mapping telemetry data of one or more players during a period of time. | Determines expected rushing routes (e.g, rushing away from offensive line, rushing through offensive line, rushing towards sideline, etc.), etc. |
| Probability of a pull | Determined, at least, by mapping telemetry data of one or more players over a period of time. | Determines probability of an offensive lineman pulling to other side to of the offensive line (e.g, pulling), etc. |
| Route combination expectations | Determined, at least, by comparing telemetry data at a start of a player with historical formation data. | Determines each expected receiver or rushing route combination for a respective formation, etc. |
| Rusher time behind line of scrimmage | Determined, at least, by mapping telemetry data of one or more players over a period of time. | Determines probability that a rusher is blocked at the line of scrimmage, average amount of time a defender is across the line of scrimmage, etc. |
| Sacks allowed in respective situations | Determined, at least, by comparing telemetry data for each play. | Determines probability of a sack per formation (e.g., sacks in rushing formation, sacks in passing formation), etc. |
| Tackles location | Determined, at least, by comparing telemetry data at an end of a play. | Determines probability of location of tacking a ball carrier, etc. |
| Targets by coverage type | Determined, at least, by comparing telemetry data from one or more player with telemetry data from the ball during a period of time. | Determines probability of a catch by each type of coverage, probability of a being targeted with a pass by each type of coverage, etc. |
| Targets by route | Determined, at least, by comparing telemetry data from one or more player with telemetry data from the ball during a period of time. | Determines probability of a catch by each route, probability of a being targeted with a pass by each type of route, etc. |
| Tendency to chop block | Determined, at least, by mapping telemetry data from two or more opposing players during a period of time. | Determines expected type of block. |

TABLE 4-continued

| Covariates derived from play-by-play telemetric data. | | |
|---|---|---|
| Statistic (Covariate) | Derivation | Analytical Use |
| Tendency to juke, spin, stiff arm, etc. | Determined, at least, by telemetry data from one or more players over a period of time. | Determines probability a player will juke, spin, stiff arm, etc. if facing a defender. |
| Tendency to sweep | Determined, at least, by mapping telemetry data from one or more offensive players during a period of time. | Determines probability of a wide receiver going into motion for each formation, etc. |
| Three down patterns | Determined, at least, by comparing telemetry data with historical formation data. | Determines probability of a pattern of passing plays and/or rushing plays (e.g, Pass-Pass-Pass, Pass-Pass-Run, Pass-Run-Pass, Pass-Run-Run, etc.) |
| Time to breach line of scrimmage for a sack and/or pass | Determined, at least, by comparing a period of time to breach line of scrimmage with a period of time to pass the ball per formation. | Determines probability of sack, amount of time to complete a pass before a sack, etc. |
| Yardage per route | Determined, at least, by mapping telemetry data from one or more players over a period of time. | Determines how each route is run (e.g., a shallow route, a deep route, etc.), average yardage per completed route, etc. |

TABLE 5

| Covariates derived from historical play-by-play data published by the NFL. | |
|---|---|
| Statistic (covariate) | Description |
| Games | The number of games a player has played at a given position, the number of games a player has played in total, etc. |
| Games Started | The number of games in which a player has started in a game at that position. |
| Passing Attempts | Number of times a player throws the ball forward, attempting to compete a pass. |
| Passing Completions | Number of times a player completes a pass to another player that is eligible to catch a pass. |
| Passing Yards | Total yards gained passing the ball for each play, for each formation, for each game, etc. |
| Passing Touchdowns | Number of completed passes resulting in a touchdown. |
| Interceptions | If a player intercepts a pass from the offensive player who threw it. |
| Longest Pass | Total yards of the longest pass play. |
| Sacks Allowed | Number of times the quarterback is tackled behind the line of scrimmage. |
| Sack Yardage | Total number of yards lost if the quarterback was sacked by the defense. |
| Fumbles | Number of times the player drops the football before a play is completed. |
| Fumbles Lost | Number of times the player loses possession of the football after fumbling the ball. |
| Completion Percentage | Percentage of completed passes. |
| Yards per Passing Attempt | Average number of yards gained per passing attempt. |
| Touchdown Percentage | Percentage of pass attempts that result in a touchdown. |
| Interception Percentage | Percentage of pass attempts that result in an interception. |
| Rushing Yards | Total rushing yards gained by a player. |
| Rushing Attempts | Number of times the player attempted to rush. |
| Rushing Touchdowns | Number of completed rushes resulting in a touchdown. |
| Longest Rush | Total yards of the longest rushing play. |
| Yards per Rushing Attempt | Average yards a player gains across the rushes the player conducted. |

TABLE 5-continued

| Covariates derived from historical play-by-play data published by the NFL. | |
|---|---|
| Statistic (covariate) | Description |
| Receptions | Number of times a player catches a forward pass. |
| Catches | Number of times a player catches a forward or lateral pass. |
| Receiving Yards | Total yards gained in catching the ball. |
| Yards after Catch | The forward yardage gained from the spot of the reception until the receiver is downed, runs out of bounds, scores, or loses the ball. |
| Yards per Reception | Average yards per reception. |
| Dropped Passes | Number of catchable balls a receiver drops. |
| Tackles Solo | Number of times a player singlehandedly takes down the ball carrier. |
| Tackles Assist | Number of times a player takes down a ball carrier with help from another player. |
| Tackles for Loss Solo | Number of solo tackles made by a player for a loss of yards. |
| Tackles for Loss Assist | Number of assisted tackles for a loss of yards. Does not include sacks. |
| Tackles for Loss Yards | Total yards lost from tackles made by a player. |
| Sacks Solo | Number of times a single player tackles the quarterback behind the line of scrimmage. |
| Sacks Assist | Number of times a player sacks the quarterback with help from another player. |
| Sack Yards | Total yards lost from sacks. |
| Passes Defended | Any pass that a defender, through contact with the football, causes to be incomplete. |
| Forced Fumbles | Number of times a player forces the player with the ball to lose it. |
| Fumble Recoveries | Number of times a player recovers a loose ball. |
| Fumble Return Yards | The yards accumulated after a ball has been fumbled, then recovered. |
| Hurries | Number of times a player forces the quarterback to throw the football before the quarterback is ready. |
| Safeties | Number of times a player scores two points by tackling an opponent in possession of the ball in his own end zone. |
| Blocks | Number of times a player blocks a punt or kick. |

TABLE 5-continued

Covariates derived from historical play-by-play data published by the NFL.

| Statistic (covariate) | Description |
|---|---|
| Interception Return Yardage | Number of yards compiled by a defensive player returning one or more interceptions. |
| Average Yards per Interception | Average number of yards gained after intercepting the football. |
| Field Goals Made | Number of good kicks between the goal posts. |
| Field Goals Attempted | Number of attempts by kicker to kick the ball between the goal posts. |
| Field Goal Percentage | Percentage of kicks made by a player that score points. |
| Field Goal Long | Longest kick made by a player or team. |
| Field Goals Blocked | Number of kicks a player or team. |
| Kickoffs | Total number of times a kicker kicked off. |
| Kickoff Yards | Total yards from kickoffs made by a kicker. |
| Kickoffs Out of Bounds | Number of kickoffs that go out of bounds. |
| Kickoff Yards Average | The average yards of kickoffs made by a kicker. |
| Kickoff Touchbacks | The number of kicks that land in the end zone or end up rolling into the end zone and are not returned. |
| Kickoff Touchback Percentage | Percentage of kickoffs that result in a touchback. |
| Onside Kicks | Number of times a kicker attempted a 10-yard kick in hopes of being recovered by the kicking team. |
| Onside Kicks Recovered | Number of 10-yard kickoff attempts recovered by the kicking team. |
| Punts | Number of punts made by a player. |
| Punting Yards | Total punt yards made by a player. |
| Yards per Punt | Average yards per punt made by a player. |
| Longest Punt | Longest punt made by a player. |
| Punt Touchbacks | Plays in which the ball is ruled dead on or behind a team's own goal line after a kickoff, punt, interception, or fumble. |
| Punting Touchback Percentage | Percentage of punts resulting in a touchback. |
| Punting Inside 20 | Punts downed inside the 20-yard line. |
| Punting Inside 20 Percentage | Percentage of punts downed inside the 20-yard line. |
| Blocked Punts | Number of punts blocked by a player. |
| Punts Returned | Number of punts returned. |
| Punts Returned Yardage | Total yardage returned. |
| Yards per Punt Return | Average yards per return. |
| Kick/Punt Return Yards | Yards returned. |
| Kick/Punt Return Attempts | Number of kicks and/or punts returned. |
| Kick/Punt Return Touchdowns | Returns resulting in a touchdown. |
| Kick/Punt Return Fair Catches | Player returning a punt signals by waving is extended arm from side to side over his head, making it illegal for the opposition to tackle him. |
| Longest Kick/Punt Return | Longest single return yardage. |
| Yards per Kick/Punt Return | Average Return Yardage. |
| Points Scored | Points for (scored). |
| Points Allowed | Points against (allowed). |
| Total Yards | Total yards (pass and rush combined). |
| Time of Possession | Amount of time a team has possession of the football. |
| Total Number of First Downs | Total number of first downs. |
| Third Down Conversions | Number or percentage of third down conversions made by a team. |
| Third Down Attempts | Number or percentage of third down attempts made by a team. |
| Fourth Down Conversions | Number or percentage of fourth down conversions made by a team. |
| Fourth Down Attempts | Number or percentage of fourth down attempts made by a team. |
| Turnovers | Number of turnovers committed and/or received by a team. |
| Number of penalties committed | Number of penalties committed by the team or player. |
| Total yards from penalties committed | Total yards from penalties committed by the team or player. |

In some embodiments, external covariates are included in the model similarly to internal covariates, while in other embodiments external covariates are omitted from the covariate analyses and model.

In various embodiments, the present competition is a football game and the point is further determined by one or more internal covariates selected from the group consisting of (i) a season-to-date summary of the passing yards of the first team and the second team, (ii) a season-to-date summary of the rushing yards of the first team and the second team, (iii) a season-to-date fumble rate of the first team and the second team, and (iv) a season-to-date interception rate of the first team and the second team. In some embodiments, the present game is a football game and the point is further determined by whether the first team or the second team is playing on their home field in the present game. In some embodiments, the one or more internal covariates include one or more covariates listed in Table 5, which includes statistical player data published by the NFL.

In various embodiments, the win/loss data for the plurality of historical games includes the first covariate parameter for one or more players from respective historical games in the plurality of historical games. The first covariate parameter in the win/loss data is derived from time-stamped position information of the one or more players captured by a telemetry tracking system during respective historical games in the plurality of historical games. The first covariate parameter in the win/loss data is used, in part, to determine the calculation of the team strength of the first team and the team strength of the second team.

In some embodiments, for a football game, the first covariate parameter (e.g., covariates listed in Table 4) is determined for a quarterback, a running back, a wide receiver, a tight end, a center, an offensive guard, an offensive tackle, a middle linebacker, an outside linebacker, a defensive end, a defensive tackle, a cornerback, a safety, a kicker, a holder, a long snapper, a punter or kick/punt returner of the first team or the second team. In some embodiments, the first covariate parameter is determined for a quarterback of the first team or the second team and the first covariate parameter is aggressiveness or a distance between a player and the quarterback per pass attempt. In some embodiments, the first covariate parameter is determined for a wide receiver of the first team or the second team and the first covariate parameter is a cushion between the wide receiver and defensive backs, a distance travelled, yardage per route, or a percentage outbreaking route. In some embodiments, the first covariate parameter is determined for a tight end of the first team or the second team and the first covariate parameter is a distance travelled, missed blocks, or a percentage outbreaking route. The covariates listed in Table 4 provide a more detailed description of positions and/or movement of the players in the field, compared to the conventionally derived covariates listed in Table 5.

In some embodiments, the plurality of historical games spans a plurality of seasons over a plurality of years. In some embodiments, the plurality of historical games comprises fifty games. In some embodiments, the plurality of historical games comprises one thousand games.

In some embodiments, the plurality of teams consists of between five and fifty teams (e.g., 32 team for the NFL). In some embodiments, the plurality of teams consists of between five and thirty teams. The first plurality of players comprises twenty players and only a subset of the plurality of players is playing in the present game at any given time. The first plurality of players comprises thirty players and wherein only a subset of the plurality of players is playing in the present game at any given time. For example, in football, 11 players from each team are on the field at a given time.

In some embodiments, the calculating and predicting is repeated at an additional time point. When the present game is football, the time point is before a first play in the present game and the additional time point is after the first play in the present game. In some embodiments, the present game is football and the time point is after a first play in the present game and the additional time point is after a second play in the present game. In some embodiments, the present game is football and the calculating and predicting is repeated after each play in the present game. For example, the prediction of the outcome of the present game is calculated after each play in the present game. Each prediction of the outcome reflects the first covariate parameter for each of the player at respective time points after each play. Quantified changes in the first covariate (e.g., $h_i$) shifts the center of the continuous distribution (see, Equation 10 above) accordingly. In some embodiments, the present game is football, and the calculating and predicting is performed at the end of the first quarter, at the end of the second quarter and at the end of the third quarter.

In some embodiments, the method 800 is performed by a device executing one or more programs (e.g., one or more programs stored in memory 502 of statistics system 500 in FIG. 5) comprising instructions to perform the method 800. In some embodiments, the method 800 is performed by a system comprising at least one processor (e.g., CPU 574) and memory (e.g., one or more programs stored in memory 502 of statistics system 500) comprising instructions to perform the method 800.

In some embodiments, the model described herein is applied to machine learning techniques (e.g., the model is processed by a machine learning engine 210 described below with respect to FIG. 2A). A set of internal covariates derived from the tracking system described with respect to FIGS. 1-7 is used as a training set (e.g., historical training data 214) to develop algorithms for producing covariant parameters that describe abilities of each player type. The algorithms are further extended to produce a prediction for a team strength and/or outcome of a game.

The model described herein can be applied to a large amount of internal covariates for all player positions of a team with the internal covariates derived from the tracking system described with respect to FIGS. 1-7. The model applied on such variables provides a more detailed description of conventional parameters used to describe a player's ability. For example, conventionally rushing yards is a parameter recorded from the position where the quarterback or direct snap player hands off or carries the football immediately after receiving the snap from the center. Rushing yards are reduced to a single parameter, either a positive or a negative number of yards, describing forward progress and reversed direction, respectively. However, with the methods and systems of the present invention, this parameter could be broken into several parameters that describe the play at more detailed level. For example, the rushed yards could be broken into two parameters-one describing how much the player was pushed back and another describing how much the player made forward progress. Additionally, parameters describing leftward and rightward movement of the player, or speed of the player could be considered.

The model described herein can be easily applied to include internal covariates related to all players of the team. For example, for rushing plays, the conventional statistical play-by-play data includes data related only to a rusher and tackler(s) and for passing plays the conventional statistical play-by-play data includes data related only to a passer, a targeted receiver, tackler(s), and interceptor. With the methods and systems described in the present disclosure, the play-by-play data includes data related to all the players on the field.

Although some of the examples above use a single covariate parameters, the process may instead use several covariate parameters. In such embodiments, additional covariates that do not require the time-stamp position information acquired through telemetry can be used in addition the covariate parameters (first covariates that are based on such telemetry data). Thus, for instance, in some embodiments two covariates or more, where one of the covariates is derived from the telemetry data one of covariates is derived from sources other than the telemetry data (e.g., a player's draft pick number, a players height, weight, and age, or any of the covariates listed in Table 5 are all examples of covariates that do not require the telemetry data).

While the present disclosure describes various systems and methods in relation to a gridiron football game, one skilled in the art will recognize that the present disclosure is not limited thereto. The techniques disclosed herein find application in games with a discrete or finite state where a player or team has possession of a ball (e.g., holding the ball) as well as other types of events. For instance, in some embodiments the systems and methods of the present disclosure are applied to events including a baseball game, a basketball game, a cricket game, a football game, a handball game, a hockey game (e.g., ice hockey, field hockey), a kickball game, a Lacrosse game, a rugby game, a soccer game, a softball game, or a volleyball game, auto racing, boxing, cycling, running, swimming, tennis etc., or any such event in which a location of a subject is relevant to an outcome of the event. For example, for baseball the calculating and predicting is repeated after each inning, other than the final inning in the present game.

The present disclosure addresses the need in the art for improved systems and methods for evaluating team strengths and players' abilities. In particular, the present disclosure provides for predicting an outcome of a live sport event based on positional and kinetic data recorded by a player tracking system during the live sport event. The present disclosure facilitates increased spectators' engagement and interest in the live sport event by providing updated predictions of the outcome while the sport event is ongoing.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system to predict an outcome of a competition between a first competitor that includes a first set of one or more participants and a second competitor that includes a second set of one or more participants, the system comprising:

a communication interface configured to receive time-stamped position information of one or more participants of one or both of the first set of participant(s) and the second set of participant(s) in the competition, the time-stamped position information captured by a telemetry tracking system during the competition; and a processor coupled to the communication interface and configured to:

calculate while the competition is ongoing a first covariate parameter for each of one or more participants in one or both of the first set of participant(s) and the second set of participant(s) at a point in time, wherein each respective first covariate parameter is derived from the time-stamped position information of a corresponding participant of the first or second set of one or more participants in the competition at the point in time; and predict the outcome of the competition, as of the point in time, based at least in part on (i) a difference between a calculated competitor strength of the first competitor and a calculated competitor strength of the second competitor based at least in part on historical data associated with the first and second competitors, respectively, and (ii) the calculated first covariate parameter(s).

2. The system of claim 1, further comprising the telemetry tracking system, wherein the telemetry tracking system is configured to determine the time-stamped position information for each participant based on signals received from tracking devices, wherein a pair of tracking devices uniquely and independently tracks a respective participant.

3. The system of claim 1, wherein the time-stamped position information captured by a telemetry tracking system includes position data of a ball or other equipment.

4. The system of claim 1, wherein the time-stamped position includes at least an x-coordinate and a y-coordinate.

5. The system of claim 1, wherein the first covariate parameter is calculated at least in part by using position information to calculate a derivative with respect to time including at least one of velocity, acceleration, and jerk.

6. The system of claim 1, wherein the competition is between a first team comprising a first subset of the first set of participants and a second team comprising a second subset of the second set of participants, and the competition is a game.

7. The system of claim 1, wherein the processor is further configured to predict the outcome including by comparing a first value for the first covariate parameter calculated for the first competitor with a second value for the first covariate parameter calculated for the second competitor.

8. The system of claim 7, wherein comparing the first value for the first covariate parameter with the second value for the first covariate parameter includes calculating a difference between the first value and the second value.

9. The system of claim 1, wherein the first covariate parameter corresponding to a first participant included in the first set of participant(s) is determined based at least in part on position information of the first participant relative to one or more participants included in the second set of participant(s).

10. The system of claim 1, wherein the processor is further configured to predict the outcome including by evaluating a continuous distribution centered at a point that is determined, at least in part, by (i) a difference between a calculated competitor strength of the first competitor and a calculated competitor strength of the second competitor based upon win-loss data included in the historical data and (ii) each first covariate parameter.

11. The system of claim 1, wherein the first covariate parameter is one of a plurality of first covariate parameters used to predict the outcome.

12. The system of claim 1, wherein the first covariate parameter is based at least in part on telemetry of the competition.

13. The system of claim 1, wherein the first covariate parameter is based at least in part on historical telemetry.

14. The system of claim 1, wherein the first covariate parameter is based at least in part on the first competitor or the second competitor.

15. The system of claim 1, wherein the first covariate parameter is external to the first competitor and external to the second competitor.

16. The system of claim 1, wherein the processor is further configured to calculate the difference between the first competitor strength and the second competitor strength based at least in part on the historical data, wherein the historical data includes win/loss data among a plurality of competitors comprising a set of competitors.

17. The system of claim 1, wherein the outcome is a predicted final score difference at an end of the competition.

18. The system of claim 1, wherein the processor is further configured to predict an outcome of a portion of the competition.

19. The system of claim 1, wherein the first covariate parameter is calculated while the competition is ongoing.

20. The system of claim 1, wherein:

the processor is further configured to provide one or more wagers to one or more client devices; and the one or more wagers are determined based at least in part on a predicted outcome.

21. A method to predict an outcome of a competition between a first competitor that includes a first set of one or more participants and a second competitor that includes a second set of one or more participants, the method comprising:

receiving time-stamped position information of one or more participants of one or both of the first set of participant(s) and the second set of participant(s) in the competition, the time-stamped position information captured by a telemetry tracking system during the competition;

calculating while the competition is ongoing a first covariate parameter for each of one or more participants in one or both of the first set of participant(s) and the second set of participant(s) at a point in time, wherein each respective first covariate parameter is derived from the time-stamped position information of a corresponding participant of the first or second set of one or more participants in the competition at the point in time; and predicting the outcome of the competition, as of the point in time, based at least in part on (i) a difference between a calculated competitor strength of the first competitor and a calculated competitor strength of the second competitor based at least in part on historical data associated with the first and second competitors, respectively, and (ii) the calculated first covariate parameter(s).

22. The method of claim 21, further comprising:

providing one or more wagers to one or more client devices, wherein the one or more wagers are determined based at least in part on a predicted outcome.

23. The method of claim 21, wherein the outcome is predicted based at least in part on evaluating a continuous distribution centered at a point that is determined, at least in part, by (i) a difference between a calculated competitor strength of the first competitor and a calculated competitor strength of the second competitor based upon win-loss data included in the historical data and (ii) each first covariate parameter.

24. The method of claim 21, wherein the competition is between a first team comprising a first subset of the first set of participants and a second team comprising a second subset of the second set of participants, and the competition is a game.

25. The method of claim 21, wherein the outcome is predicted based at least in part on comparing a first value for the first covariate parameter calculated for the first competitor with a second value for the first covariate parameter calculated for the second competitor.

26. A computer program product embodied in a non-transitory computer readable storage medium and comprising computer instructions that, when executed, cause a processor to:

receive time-stamped position information of one or more participants of one or both of a first set of participant(s) and a second set of participant(s) in a competition, the time-stamped position information captured by a telemetry tracking system during the competition;

calculate while the competition is ongoing a first covariate parameter for each of one or more participants in one or both of the first set of participant(s) and the second set of participant(s) at a point in time, wherein each respective first covariate parameter is derived from the time-stamped position information of a corresponding participant of the first or second set of one or more participants in the competition at the point in time; and predict the outcome of the competition, as of the point in time, based at least in part on (i) a difference between a calculated competitor strength of a first competitor that comprises the first set of participant(s) and a calculated competitor strength of a second competitor that comprises the second set of participant(s) based at least in part on historical data associated with the first and second competitors, respectively, and (ii) the calculated first covariate parameter(s).

27. The computer program product of claim 26, further comprising computer instructions that, when executed, cause the processor to:

provide one or more wagers to one or more client devices, wherein the one or more wagers are determined based at least in part on a predicted outcome.

28. The system of claim 27, wherein the processor is further configured to receive from at least one of the one or more client devices an indication that a wager has been placed with respect to the competition.

29. The computer program product of claim 26, wherein the outcome is predicted based at least in part on evaluating a continuous distribution centered at a point that is determined, at least in part, by (i) a difference between a calculated competitor strength of the first competitor and a calculated competitor strength of the second competitor based upon win-loss data included in the historical data and (ii) each first covariate parameter.

* * * * *

UNITED STATES PATENT AND TRADEMARK OFFICE

CERTIFICATE OF CORRECTION

PATENT NO. : 11,311,808 B2
APPLICATION NO. : 16/747434
DATED : April 26, 2022
INVENTOR(S) : Erik Schwartz et al.

It is certified that error appears in the above-identified patent and that said Letters Patent is hereby corrected as shown below:

On the Title Page

Drawing, second competitor, delete "Participant 3" and insert --Participant 6--, therefor.

In page 2, Column 2, item (56), U.S. Patent documents, cite no. 2, delete "Tort" and insert --Torf--, therefor.

In the Drawings

In sheet(s) 10 of 10, figure 9, second competitor, delete "Participant 3" and insert --Participant 6--, therefor.

Signed and Sealed this
First Day of November, 2022

Katherine Kelly Vidal

Katherine Kelly Vidal
*Director of the United States Patent and Trademark Office*